(12) United States Patent
Love

(10) Patent No.: US 7,565,414 B1
(45) Date of Patent: Jul. 21, 2009

(54) SYSTEM AND METHOD FOR TRANSLATING AND TRANSFERRING FILES IN A NETWORKED SYSTEM

(75) Inventor: Richard I. Love, Encinitas, CA (US)

(73) Assignee: Acuprint, Inc., Carlsbad, CA (US)

( * ) Notice: Subject to any disclaimer, the term of this patent is extended or adjusted under 35 U.S.C. 154(b) by 795 days.

(21) Appl. No.: 10/987,052

(22) Filed: Nov. 12, 2004

(51) Int. Cl.
*G06F 15/16* (2006.01)

(52) U.S. Cl. ............... 709/219; 709/217; 709/218

(58) Field of Classification Search ............ 709/219
See application file for complete search history.

(56) References Cited

U.S. PATENT DOCUMENTS

| | | | | |
|---|---|---|---|---|
| 5,710,889 | A * | 1/1998 | Clark et al. | 235/379 |
| 5,911,066 | A * | 6/1999 | Williams et al. | 719/310 |
| 6,594,692 | B1 * | 7/2003 | Reisman | 709/219 |
| 2001/0028364 | A1 * | 10/2001 | Fredell et al. | 345/751 |
| 2002/0194226 | A1 * | 12/2002 | Sheth et al. | 707/517 |

OTHER PUBLICATIONS

BancBridge. http://www.bancbridge.com/treasuryagent.html Aug. 19, 2004, 5 pgs.
Kowalczyk, K. Weblog without honor or humanity. http://blog.kowalczyk.info/articles/usingUnison.html. May 29, 2004, 3 pgs.
New! Internet Macros—web automation, web testing and data extraction. http://www.iopus.com/iim.htm Aug. 19, 2004, 5 pgs.
Unison File Synchronizer. http://www.cis.upenn.edu/~bcpierce/unison/ Aug. 19, 2004, 2 pgs.
Win-Task—the ultimate automation software and task scheduler. Automate your repetitive computer tasks. http://www.wintask.com/index.htm Aug. 19, 2004, 3 pgs.

* cited by examiner

*Primary Examiner*—Patrice Winder
*Assistant Examiner*—Azizul Choudhury
(74) *Attorney, Agent, or Firm*—Knobbe Martens Olson & Bear LLP

(57) ABSTRACT

Embodiments of the systems and methods provide automated transfer of files between a client computer and a server computer in a networked environment. The file transfer system provides secure data communication using file encryption and decryption techniques. In addition, the file transfer system can automatically translate files to and from various formats as required without user intervention or action. Files can be transferred by drag and drop file operations, scheduled for predetermined times or intervals, or upon the occurrence of user-defined events. In some embodiments, the file transfer system transfers files between a server computer for a bank website and a client computer of a bank customer having an account at the bank.

32 Claims, 23 Drawing Sheets

SYSTEM AND METHOD FOR TRANSLATING AND TRANSFERRING FILES IN A NETWORKED SYSTEM

RELATED APPLICATIONS

This application claims the benefit under 35 U.S.C. § 119 (e) of U.S. Provisional Application No. 60/460,593, filed Apr. 7, 2003 and titled "TRANSPORTER," which is hereby incorporated by reference in its entirety.

BACKGROUND OF THE INVENTION

1. Field of the Invention

The invention generally relates to networked computer systems. More particularly, the invention relates to systems and methods for translating and automating the transfer of files between client and server computer systems via network communications.

2. Description of the Related Technology

Computer systems are commonly connected to other computer systems for sharing computer resources and transferring data files. As one example, in the banking industry, bank account information in the form of data files is transferred in both directions between a client computer and a bank computer. The client computer can be a computer system used by the client of a bank such as a business that maintains a corporate bank account with the bank. The bank computer can be a computer system used by a financial institution, for example, Wells Fargo Bank, Bank of America or Union Bank of California, to name just a few, in managing the various bank accounts maintained by the bank. For example, current account balance is often transferred from the bank computer to the client computer, and information on checks that have been written can be transferred from the client computer to the bank computer.

In the banking industry, the transfer of files between client and bank computers is commonly accomplished via a direct connection. Typically, the direct connection consists of a modem connected to the client computer transferring data over a telephone line to a modem connected to the bank computer. A modem is a device or program that enables a computer to transmit data over, for example, telephone or cable lines, by translating digital computer data into corresponding analog signals, and vice versa. One favorable feature of transferring data via modems is that the data is secure as the connection is generally private. However, transferring data via modem is also very time consuming and expensive, for both the banks and the clients.

Many banks utilize web servers for managing client accounts through the banks' websites via the Internet. One benefit of the Internet is that access to it is readily available. However, the Internet is a public network, so clients and banks have concerns about the security of sensitive account data transferred over the Internet. Internet data can be encrypted, but doing so causes a significant burden on the banks to enable the encryption on the bank side of the connection as well as at each of the potentially large number of computers of clients that have accounts with the bank. The transfer of files and other data to and from current bank websites is not automated, thereby causing clients to resist or altogether refuse the transfer of data to and from the bank websites via the Internet because of the time, expense and inherent human errors in manually-initiated file transfers.

Thus, what is needed is a secure, automated way of transferring files between a client computer and a server computer via a public network that reduces the chances of human error and is more efficient. By being more efficient and with fewer human errors, the automated transfer of files is less expensive and more reliable than transferring files by manually-initiated operations.

SUMMARY OF CERTAIN INVENTIVE ASPECTS

The systems and methods of the invention have many features, no single one of which is solely responsible for its desirable attributes. Without limiting the scope of the invention as expressed by the claims that follow, some prominent features will now be discussed briefly. After considering this discussion, and particularly after reading the section entitled "Detailed Description of Certain Embodiments," one will understand how the features of the system and methods provide advantages over traditional systems.

Embodiments of the present systems and methods provide for transferring files between a client computer and a server computer via a network, which includes a transporter module configured to execute on a client computer and to receive a file send request including information regarding a file to be sent, and send a request for transmission of the file via a network. Additionally included is a websend module configured to execute on the client computer and to receive the request for transmission of the file via the network, read a script file that includes information indicating how to communicate with a server computer for file transmission, and send the file to the server computer via the network according to the information in the script file. Also included is a notification and error handling module configured to notify a user of an occurrence of a file transmission event or error.

In some embodiments, this further includes a data center computer connected via the network and configured to translate the file from a first file format to a second file format. This can also include an auto-update module configured to update the script file from a remote computer system via the network. Further included is a connect and transfer module configured to read login information for a proxy server from a proxy settings file and to login to the proxy server using the login information to enable the file to be sent to the server computer. In some embodiments, the file is encrypted so that the file is only decipherable by authorized recipients of the file. In addition, the file send request can be a drag and drop file operation, a scheduled event, an event triggered by the existence of a file in a predetermined directory, or an event triggered by the non-existence of a file in a predetermined directory.

In other embodiments, the server computer can operate a website of a bank, and account and payment information can be uploaded and downloaded from the website. Additionally, the client computer can be operated by a user having at least one account with the bank. Still further, the file can include information on a check written against the account, positive pay files and reports, Automated Clearing House (ACH) payments, Electronic Funds Transfer (EFT) payments, wire transfers, Electronic Data Interchange (EDI) files and reports, and cash and account balances. Notifying the user can include sending an email message to the user. In addition, the network can be the Internet and the server computer can be a file transfer protocol (FTP) server of a bank, and the account and payment information can be uploaded and downloaded from the FTP server.

In certain embodiments, the systems and methods provide for transferring files between a client computer and a server computer via a network, and include a connect and transfer module configured to read login information for a proxy server from a proxy settings file and to login to the proxy server using the login information, thereby enabling receipt of files via the network. Also included is a websend module executing on a client computer and configured to receive a request from a server computer for receipt of an encrypted file via a network, read a script file that includes information indicating how to communicate with the server computer for file receipt, receive the encrypted file from the server computer according to the information in the script file, and send a file receipt request and an indicator of the encrypted file. The systems and methods additionally include a transporter module executing on the client computer and configured to receive a file receipt request including information of the encrypted file to be received, decrypt the encrypted file to form a file that is in a readable format, and store the file at the client computer. Further included are an auto-update module configured to update the script file from a remote computer system via the network, and a notification and error handling module configured to notify a user of an occurrence of a file transmission event or error.

Embodiments of the systems and methods additionally provide for transferring files between a client computer and a server computer via a network, and include means for receiving a file send request including information of a file to be sent, and means for encrypting the file so that the file is decipherable only by authorized recipients of the file. Additionally included are means for reading a script file that includes information indicating how to communicate with a server computer for file transmission, and means for reading login information for a proxy server from a proxy settings file. Further included are means for logging in to the proxy server using the login information, and means for sending the encrypted file to the server computer via the network according to the information in the script file. In addition, the systems include means for updating the script file from a remote computer system via the network, and means for notifying a user of an occurrence of a file transmission event or error.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

Figure 1:
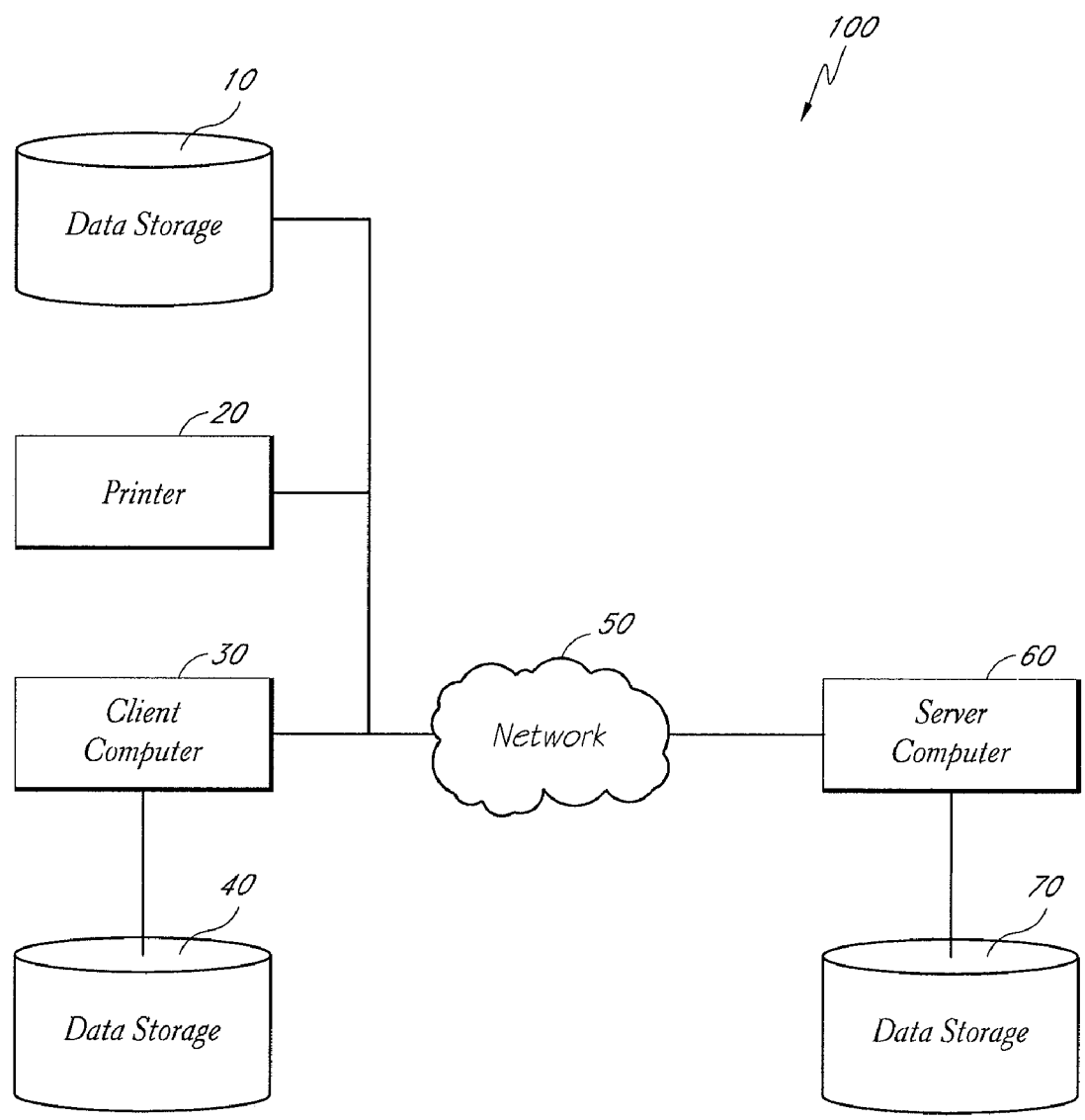
FIG. 1 is a block diagram illustrating one example of a networked computer system in which the file transfer system can operate.

The following detailed description is directed to certain specific embodiments of the invention. However, the invention can be embodied in a multitude of different ways as defined and covered by the claims. The scope of the invention is to be determined with reference to the appended claims. In this description, reference is made to the drawings, wherein like parts are designated with like numerals throughout.

The file transfer system described herein can be implemented as various modules in different embodiments as discussed in detail below. The components or modules can be implemented as, but are not limited to, software, hardware or firmware components, or any combination of such components, that perform certain functions, steps or tasks as described herein. Thus, for example, a component or module may include software components, firmware, microcode, circuitry, an application specific integrated circuit (ASIC), and may further include data, databases, data structures, tables, arrays, and variables. In the case of a software embodiment, each of the modules can be separately compiled and linked into a single executable program, or may be run in an interpretive manner, such as a macro. The functions, steps or tasks associated with each of the modules may be redistributed to one of the other modules, combined together in a single module, or made available in, for example, a shareable dynamic link library. Furthermore, the functionality provided for in the components or modules may be combined into fewer components, modules, or databases or further separated into additional components, modules, or databases. Additionally, the components or modules may be implemented to execute on one or more computers.

The file transfer systems are described herein primarily in the example context of systems for transferring files with financial account information, such as transferring files between bank computer systems and corporate client computer systems. However, other embodiments of the invention include many types of file transfer systems, for example, systems having different file formats and systems storing copies of files in different locations. Generally, the file transfer systems are configured to optionally translate files to other format(s), where necessary, and transfer the files via a network, for example, in an automated manner. The financial file transfer systems utilized by banks and their clients as described herein are only example embodiments of the file transfer systems. In addition, while the embodiments described herein are in the context of the transfer of files, other embodiments involve the transfer of data messages that can be of any length. For example, the file transfer system can access data generated at a website or server computer and generate a report file from the accessed data.

The file transfer system can be configured to send various types of banking data and files. Examples of banking data and files include Automated Clearing House (ACH), Electronic Data Interchange (EDI), electronic fund transfer (EFT), positive pay, wire transfer, and account or cash balance report data and files. ACH files are used to perform electronic fund transfers (EFT), or make payments from one account to another electronically. EDI files refer to a set of American National Standards Institute (ANSI) defined files that enable the communication of electronic data, such accounting data to be passed between trading partner computers. Examples of EDI files are electronic invoices, remittance information, and payment instructions. The positive pay files are used to help businesses and banks combat check fraud. These files contain information about checks that have been issued for payment. The wire transfer files are another form of electronic payment, and are commonly used to move large amounts or money, or move money very quickly. The account/cash balance reports can be files or html generated data that provides reporting information or summary information for specific bank accounts. If the data is generated by the host server as HTML, then the program will convert the relevant HTML into a file for storage on the client computer.

The file transfer system utilizes a public network, for example, the Internet, to transfer files and data between the client computer systems and the bank server systems. The transferred data can include bank account balance information, information on checks written by the client, and information on checks that have been cashed, to name just a few. The connection between the client computer and the bank server can remain active, or the connection can be initiated each time data is to be transferred and then disconnected at the end of each data transfer session. The latter connection example makes for a more secure environment with regards to the client computer, bank server, and the data stored thereon. However, this example also results in more time consuming data transfers because the connection is initiated and terminated for each file or group of files transferred.

If security measures are not taken, data communications on a public network are capable of being intercepted by unauthorized computers. Data security in the transfer of bank files is especially important because of the very confidential nature of bank account information and the potential for unauthorized individuals to remove funds from a company's bank account. One common example of securing data communications on the Internet is encryption. Files are encrypted by the sender prior to data transfer, and decrypted by the recipient upon receipt of the file. To read an encrypted file, the recipient must have access to a secret key or password that enables decryption of the file. Without the key, the contents of the encrypted file are unreadable. The file transfer system can ensure file security by utilizing encryption of transferred files or by using secure Internet connections. For example, encryption can be accomplished by utilizing a web session protocol, such as secure hypertext transfer protocol (HTTPS) which uses secure sockets layer (SSL) protocol to encrypt and transfer the data, or the encryption of the files prior to sending the files across the Internet.

The file transfer system additionally automates the transfer of files to save time and money for the client, as well as to reduce errors that are inherent in manually performed operations. Automation can be in many forms, for example, drag and drop file operations, scheduled file operations, and event-driven file operations. File transfers can be initiated by the file transfer system executing on the client computer, or by systems executing on the web server. The file transfer system can also notify users that automated file transfers have occurred, for example, by sending email messages, displaying screens on the client computer display, leaving cell phone messages, and paging users on their pagers.

Still further, the file transfer system can utilize files or scripts that contain information on how to communicate with a bank's website. These scripts can be contained in files that are flexible and extendable, for example, Extensible Markup Language (XML) files. In some embodiments, there can be a single XML script for communicating with each bank website. Alternatively, there can be multiple XML scripts for communicating with each bank website, or a single XML script can have information on communicating with multiple bank websites. It is not unusual for a bank to change the operation of its website in ways that affect the process of transferring files to and from the website. When a bank changes its website operation in this way, it is often necessary to update the corresponding XML script. With a large number of bank websites that can potentially incorporate operational changes frequently, the task of keeping the XML scripts up-to-date on a large number of client computers can be quite cumbersome if performed manually. Thus, the file transfer system includes an auto-update capability for updating XML scripts in an automated manner. Using the auto-update capability, an XML script for a particular bank that has altered its website is modified once and automatically transferred to all the client computers that transfer files to and from the particular bank website. For example, the XML scripts can be modified at one or more servers or data center computers operated by the company that makes the file transfer system and transferred to the client computers via the Internet.

Additionally, as most computer users are already very familiar with drag and drop file operations, the operation of the file transfer system is very easy and quick for the user of the client computer to learn. Thus, little or no user training is usually required. Also, the user interface of the file transfer system is very intuitive and easy to use, so that scheduled and event-driven file transfer operations can be setup by users with little or no training. In addition, the file transfer system enables setting up very robust and flexible scheduling and event-driven operations. Thus, users of the client computers can begin using the file transfer system very quickly after installation, so that little or no money and time need to be spent on training.

The file transfer system can optionally provide translation of files between multiple file formats. For example, many banks maintain their own format for files and data transferred to and from clients. In addition, an individual bank can maintain multiple file formats, for example, as a result of acquiring multiple banks with different file formats. It would be a large burden for clients to have to ensure that files are translated to the correct file format for the corresponding bank, especially for clients having accounts at multiple banks having potentially many different file formats. The file transfer system can automatically translate files to and from the appropriate file format, for example, at the client computer or at one or more servers or data center computers connected to the public network.

The file transfer system includes intelligent and robust report retrieval capabilities. In some cases, clients may want to download files from the bank website that have varying file names, or download multiple files. The file transfer system is capable of querying the files available for downloading and detecting the desired file(s) with built in file matching logic. In addition, clients can request that various reports be downloaded from the bank website to the client computer. The reports are often generated on the fly, or can be stored based on some date range criteria. The file transfer system is capable of calculating dates for the reports from common phrases such as "yesterday," "last week" or "last month," and includes the capability to skip non-business days such as holidays and weekends. For example, if a user on a Monday requested a particular report with the date criteria "yesterday," the file transfer system can convert the request to a report for the previous Friday.

In addition, the file transfer system is capable of automatic proxy server and firewall detection and login. A proxy server is a server located on the network between the client computer and the web server computer. The proxy server intercepts requests to the web server and fills the requests itself if it can. For example, if the client computer requests a web page that has been recently requested and is stored in the proxy server, the proxy server returns its copy of the web page directly to the client computer without sending the request to the web server. In this way, proxy servers can dramatically increase network performance by returning requests much more quickly and reducing the amount of external network traffic. Proxy servers can also be configured to filter requests, for example, to restrict access to certain websites. A firewall is a computer system configured to prevent unauthorized access to a private network from an external public network.

The file transfer system can automatically detect the presence of a proxy server or firewall. The file transfer system can be configured to automatically login to the proxy server or firewall, for example by providing authenticating information such as a username and password. The authenticating information can be stored on a hard disk drive accessible by the client computer, or another persistent storage device such as flash memory, floppy disk drive, or tape drive.

The file transfer system additionally provides multi-tiered security for access and control of features and scripts of the system. In some embodiments, the security control access of features is based upon user logins. The administrator of the file transfer system can add, delete, and modify user logins and access privileges, as well as set the permission levels for each user. For example, one user can have the ability to download files from only one bank account (access to a single script), while another user can have access to all of the scripts. Security permissions can be set for, but are not limited to, script access, scheduling, modifying users, viewing logs, and adding scripts. When a user logs into the system, his or her user permission level is retrieved and access levels are set.

Referring to the figures, FIG. 1 is a block diagram illustrating one example of a networked computer system 100 in which the file transfer system can operate. The networked computer system 100 includes a client computer 30, which can include, for example, a personal computer, a handheld computing device such as a personal digital assistant (PDA), a server, or a laptop computer. The client computer 30 often is connected to a data storage device 40 for long term, reliable storage of data. The data storage device 40 can be a hard disk drive, a floppy disk drive, a tape storage device, or a memory storage area such as a flash memory device, which is a memory device that can be erased and reprogrammed in blocks.

The client computer 30 is connected to a server computer 60 via a network 50. The network 50 provides the capability for the client computer 30, the server computer 60, and any other computing devices that may be connected to the network 50, to communicate with each other for the transfer of data. The network 50 can be an Ethernet network, a local area network, a wide area network, a wireless network, or any other connection between computing devices for transferring data. A popular public network in use today is the Internet utilizing the TCP/IP network protocol. The network 50 is shown in FIG. 1 as a cloud-like symbol to illustrate the many different types of networks, connections and protocols that can be used in network configurations. Although the networked computer system 100 shown in FIG. 1 includes two computers for ease of understanding, often many computers are connected in network configurations. The server computer 60 can be connected to a data storage device 70 for long term, reliable storage of data. The data storage device 40 can be a hard disk drive, a floppy disk drive, a tape storage device, or a memory storage area.

The networked computer system 100 can also include a printer 20 and a shared data storage device 10 that can be used by any computer system connected to the network 50. The printer 20 can be connected to the network 50 and shared by other computer systems, or directly connected to the client computer 30 for dedicated use by the client computer 30 only (not shown).

Figure 2:
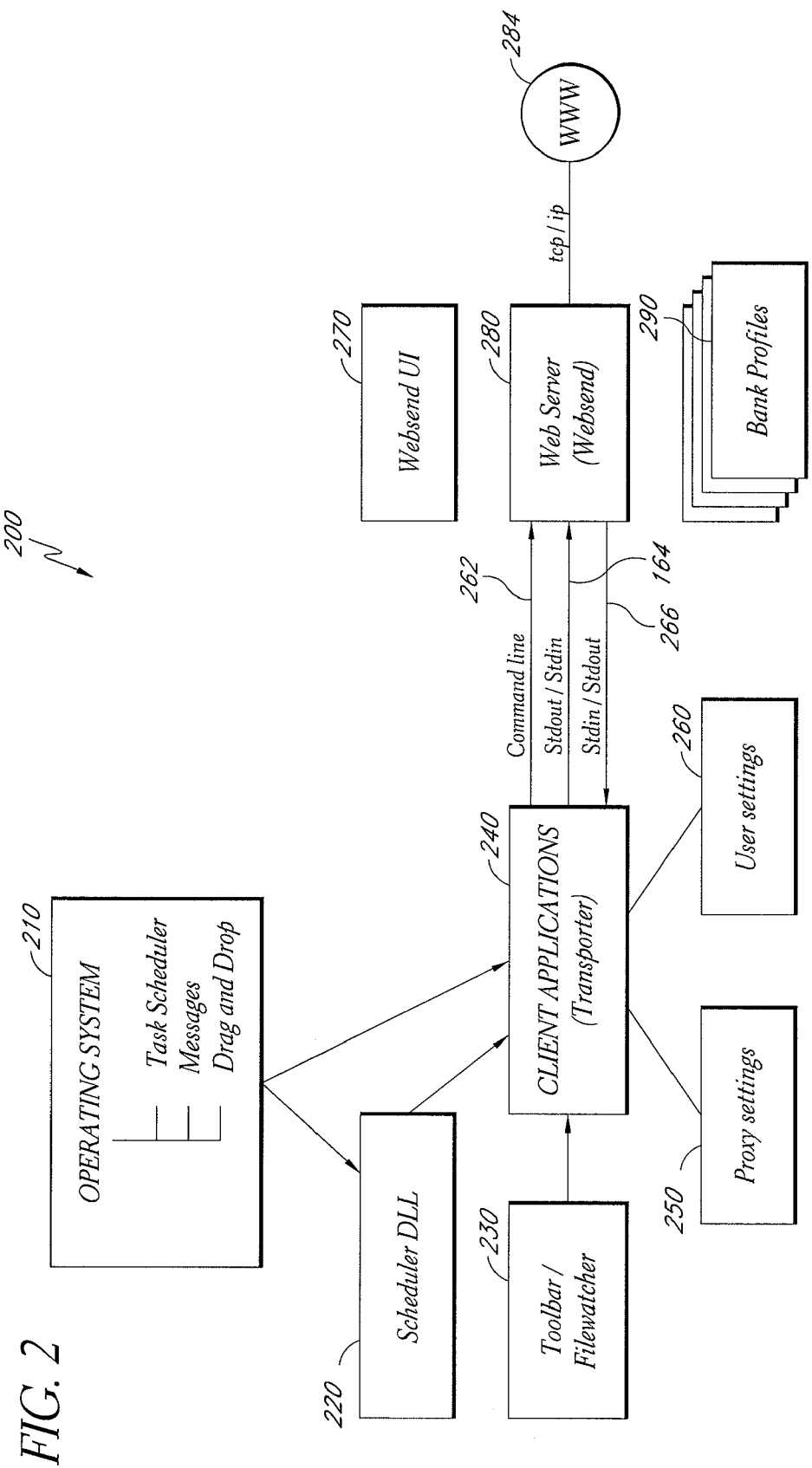
FIG. 2 is a system block diagram illustrating an embodiment of the modules of the file transfer system.

FIG. 2 is a system block diagram illustrating an embodiment of the modules of the file transfer system 200. The file transfer system 200 includes an operating system 210. The operating system 210 can be, for example, such popular operating systems as Windows, Unix and Linux. The operating system 210 includes modules or functions that can be called by application programs executing on the operating system 210. The applications programs execute the operating system functions by invoking an interface module that is part of the application program interface (API) defined for the operating system. The API defines the modules that application programs can invoke to perform operating system functions. In the operating system 210 shown in FIG. 2, the operating system functions that are available include a task scheduler function, a messages function, and a drag and drop function.

The file transfer system 200 can include a scheduler dynamic link library (DLL) 220. A dynamic link library (DLL) is a library of executable functions or data that can be used by an applications program. Often, a DLL provides one or more particular functions and a program accesses the functions by creating either a static or dynamic link to the DLL. A static link remains constant during program execution while a dynamic link is created by the program as needed. The scheduler DLL includes functions that can be invoked by modules of the file transfer system 200 for performing scheduling operations, for example, for scheduled file transfers.

The file transfer system 200 can additionally include a toolbar/file watcher module 230 for monitoring folders or directories on the data storage device 40 or the data storage device 10 for certain file events. The file events can include the creation or deletion of a certain file with a certain filename. The file transfer system 200 can be configured to automatically transfer certain file(s) between the client computer 30 and the server computer 60 based on the file events. This is referred to as event-driven file transfers, which utilizes the toolbar/file watcher module 230 to determine when the triggering of the specified file event has occurred. The toolbar/file watcher module 230 is active whenever the file transfer system 200 is executing. While executing a program in the toolbar, the user can access the program's menu system and execute a script, log in or out of the program, or launch the user interface.

The file transfer system 200 additionally includes a client applications module 240, also referred to herein as the transporter module 240. The transporter module 240 performs many of the functions that execute on the client computer 30. The functions include the drag and drop file capability, the file transfer scheduling, the event-driven file transfer functionality, the email notifications of file transfers, and providing the user interface functionality through which the users interact with the file transfer system 200. The functionality of the transporter module 240 is described below with regard to certain of the following flowcharts.

Still further, the file transfer system 200 can include a proxy settings file 250 for storing proxy server or firewall login information for automatically entering upon detection of the presence of a proxy server or firewall. The file transfer can additionally include a user settings module 260 for storing and retrieving various configuration settings that are potentially different for each user of the transporter module 240. Thus, each user can store his or her own settings that can be retrieved and restored, for example, login information to be used when the user logs into the file transfer system 100.

The file transfer system 100 can also include a web server module 280, which is alternatively referred to as a websend module 280. The websend module 280 performs functions associated with communicating with the server computer 60 of the bank website or file transfer protocol (FTP) site via the network 50. The website or FTP site is shown in FIG. 2 by a block 284 labeled "WWW," which is a common abbreviation for the "World Wide Web." The functions performed by the websend module 280 can include reading bank profiles 290, for example, scripts, that describe how to interface with a particular bank website, automatic proxy detection, multi-tiered user security, uploading and downloading of files from the bank server computer 60, and automatic updates of the bank profiles 290 from another computer or computers connected via the network 50. The websend module 280 can additionally be controlled by a user utilizing the websend user interface (UI) 270. The websend user interface 270 provides an easy to use and intuitive way of accessing various features and displaying certain aspects of the operation of the websend module 280.

The transporter module 240 of the file transfer system 200 can interface with the websend module 280 by sending the command line text to the websend module 280 via a command line link 262. Thus, command line parameters or other program invocation options that are processed by the transporter module 240 can be communicated to and processed by the websend module 280 as well. The transporter module 240 also sends commands and other data entered by the user to the websend module 280 via a stdout/stdin communication link 264. Similarly, the websend module 280 sends commands and other data entered by the user to the transporter module 240 via a stdin/stdout communication link 266. In some programming languages, stdin refers to input devices such as keyboards for entering user commands, while stdout refers to output devices such as display terminals for displaying information to the user. In these cases, stdin and stdout are referred to as communication pipes that are utilized by the transporter module 240 and the websend module 280 to send information back and forth.

Figure 3:
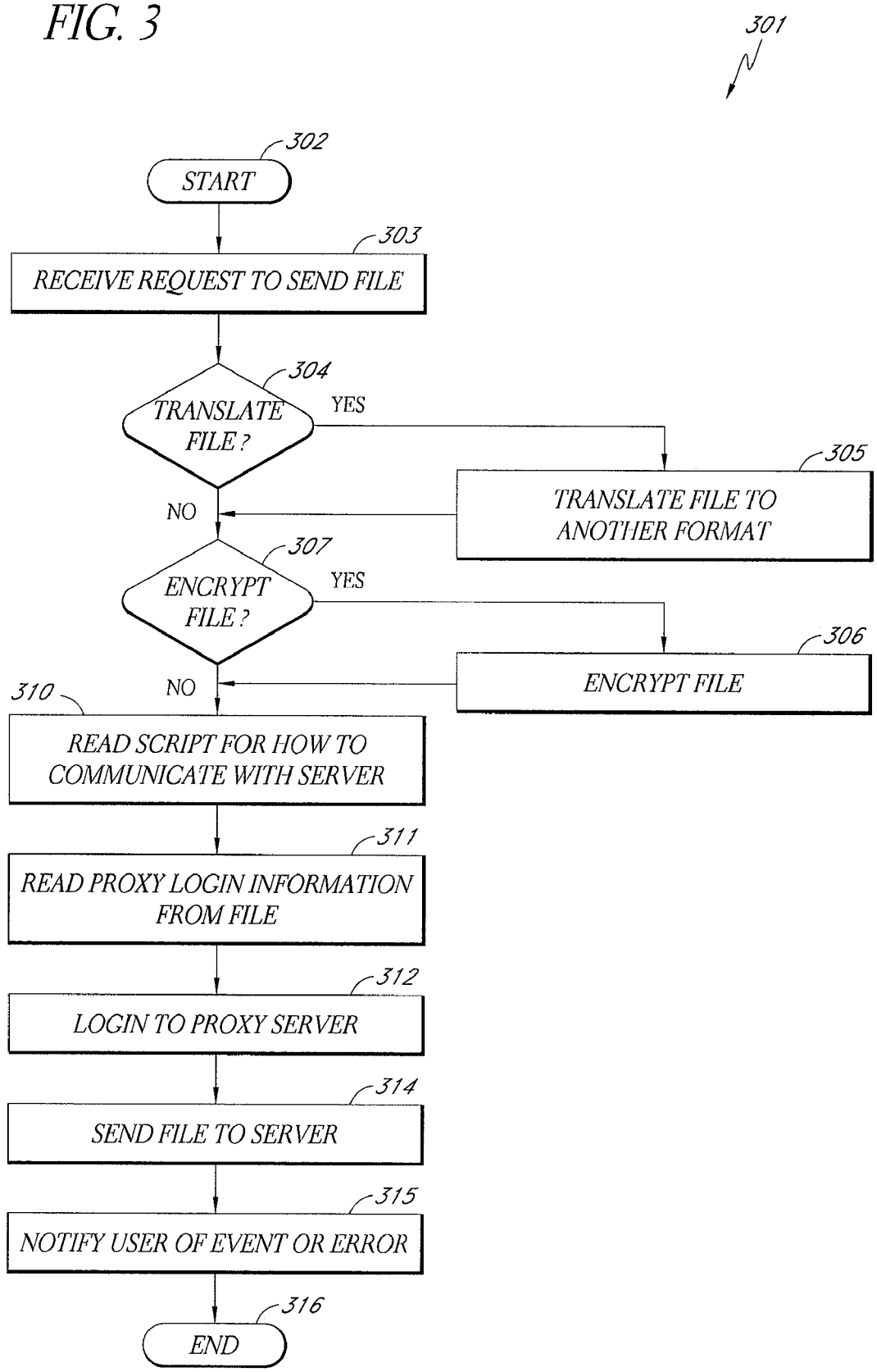
FIG. 3 is a flowchart illustrating a top-level process of sending files from the client computer to the server computer via the network.

FIG. 3 is a flowchart illustrating a top-level send file process 301 of sending files from the client computer 30 to the server computer 60 via the network 50. The send file process 301 begins at a start block 302. At a block 303, the send file process 301 receives a request from the user to send the file from the client computer 30 to the server computer 60. The request can be in many forms, for example, a drag and drop file operation from a user, a scheduled timer operation, an event such as a file watcher event, or a request from the server computer 60 for the client computer 30 to send a file.

At a decision block 304, it is determined whether to translate the file from one file format to another file format. One example of different file formats is that two different banks can have two different file formats. In addition, the same bank can have different file formats for different account holders. If it is determined at the decision block 304 to translate the file, the send file process 301 continues to a block 305 to perform the file translation from one format to another format. In some embodiments, the file translation is performed on a separate computer at the same location or at a remote location from the client computer 30 and the server computer 60. Alternatively, the file translation of the block 305 can be performed locally at the client computer 30.

After the block 305, or if it is determined at the decision block 304 that the file is not to be translated, the send file process 301 continues to a decision block 307 where it is determined whether to encrypt the file for data security. In some embodiments, the file encryption is performed at the client computer 30 and the file is decrypted after receipt on the server computer 60. Alternatively, the encryption can automatically be performed when the bank website is a secure hypertext transfer protocol (HTTPS) site. If it is determined at the decision block 307 that file encryption is to be performed, a block 306 encrypts the file so that it is not readable by unauthorized recipients of the file. After the encryption at the block 306, or if it is determined at the decision block 307 not to encrypt the file, a block 310 reads the bank profile script file for information on how to communicate with the particular bank server computer 60.

At a block 311, the proxy login information is read from the proxy settings file 250 for automated login in the case where there is a proxy server connected to the client computer 30. The send file process 301 continues to a block 312 where it logs in to the proxy server. At a block 314, the file is sent to the server computer 60 via the network 50. The send file process 301 continues to a block 315 where it notifies the user of an event such as a file successfully sent event or of any error that might have occurred. The send file process 301 terminates at the end block 316.

Figure 4:
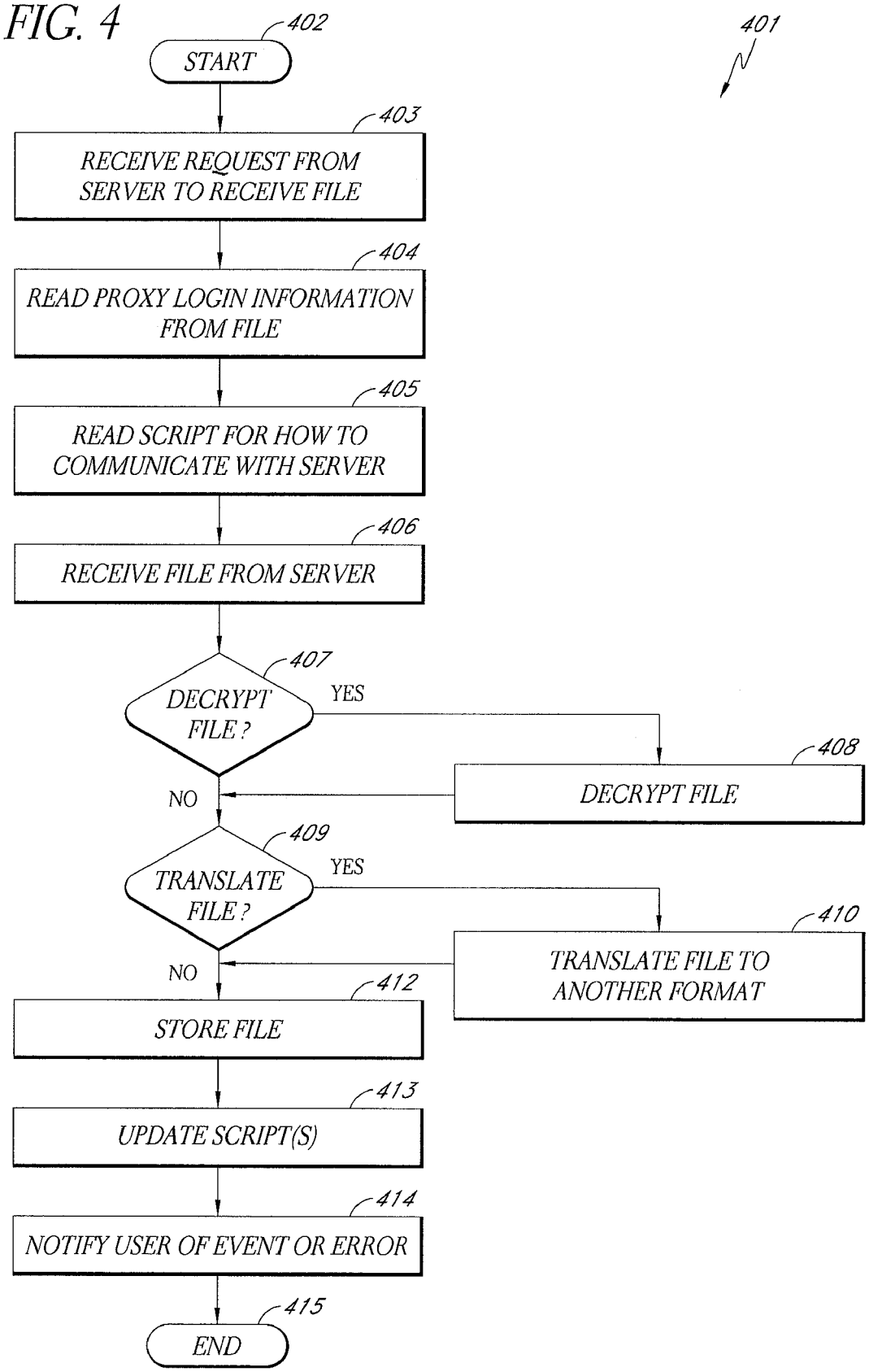
FIG. 4 is a flowchart illustrating a top-level process of receiving files at the client computer from the server computer via the network.

FIG. 4 is a flowchart illustrating a top-level receive file process 401 for receiving files at the client computer 30 sent from the server computer 60 via the network 50. The receive file process 401 begins at a start block 402. At a block 403, the receive file process 401 receives a request from the server computer 60 to receive a file to be sent from the server computer 60 to the client computer 30. For example, the server computer 60 can request that the client computer 30 receive a file or data stream containing bank account balance information.

At a block 404, the proxy login information is read from the proxy settings file 250 (see FIG. 2) for automated login in the case where there is a proxy server connected to the client computer 30, and the proxy server automatic login is performed. After the block 404, a block 405 reads the bank profile script file for information on how to communicate with the particular bank server computer 60. At a block 406, the file is received from the server computer 60 via the network 50.

At a decision block 407, it is determined whether to decrypt the file for data security. In some embodiments, the file decryption is performed at the client computer 30 and the file is encrypted before sending by the server computer 60. Alternatively, the decryption can automatically be performed when the bank website is a secure hypertext transfer protocol (HTTPS) site. If it is determined at the decision block 407 that file decryption is to be performed, a block 408 decrypts the file so that it is readable at the client computer 30, which is an authorized recipient of the file.

If it is determined at the decision block 407 not to decrypt the file, or after the block 408, receive file process 401 continues to a decision block 409 and determines whether to translate the file from one file format to another file format. If it is determined at the decision block 409 to translate the file, the receive file process 401 continues to a block 410 to perform the file translation from one format to another format. In some embodiments, the file translation is performed on a separate computer at the same location or at a remote location from the client computer 30 and the server computer 60. Alternatively, the file translation of the block 410 can be performed locally at the client computer 30.

After the block 410, or if it is determined at the decision block 409 that the file is not to be translated, the receive file process 401 continues to a block 412 to store the received file locally at the client computer 30 for later access. At a block 413, the receive file process 401 updates the profile script files indicating how to communicate with the particular server computer 60. In some embodiments, the script updating at the block 413 is performed in an automated fashion without any user action required. The receive file process 401 continues to a block 414 to notify the user of an event such as a file successfully received event or of any error that might have occurred. The receive file process 401 terminates at the end block 415.

Figure 5:
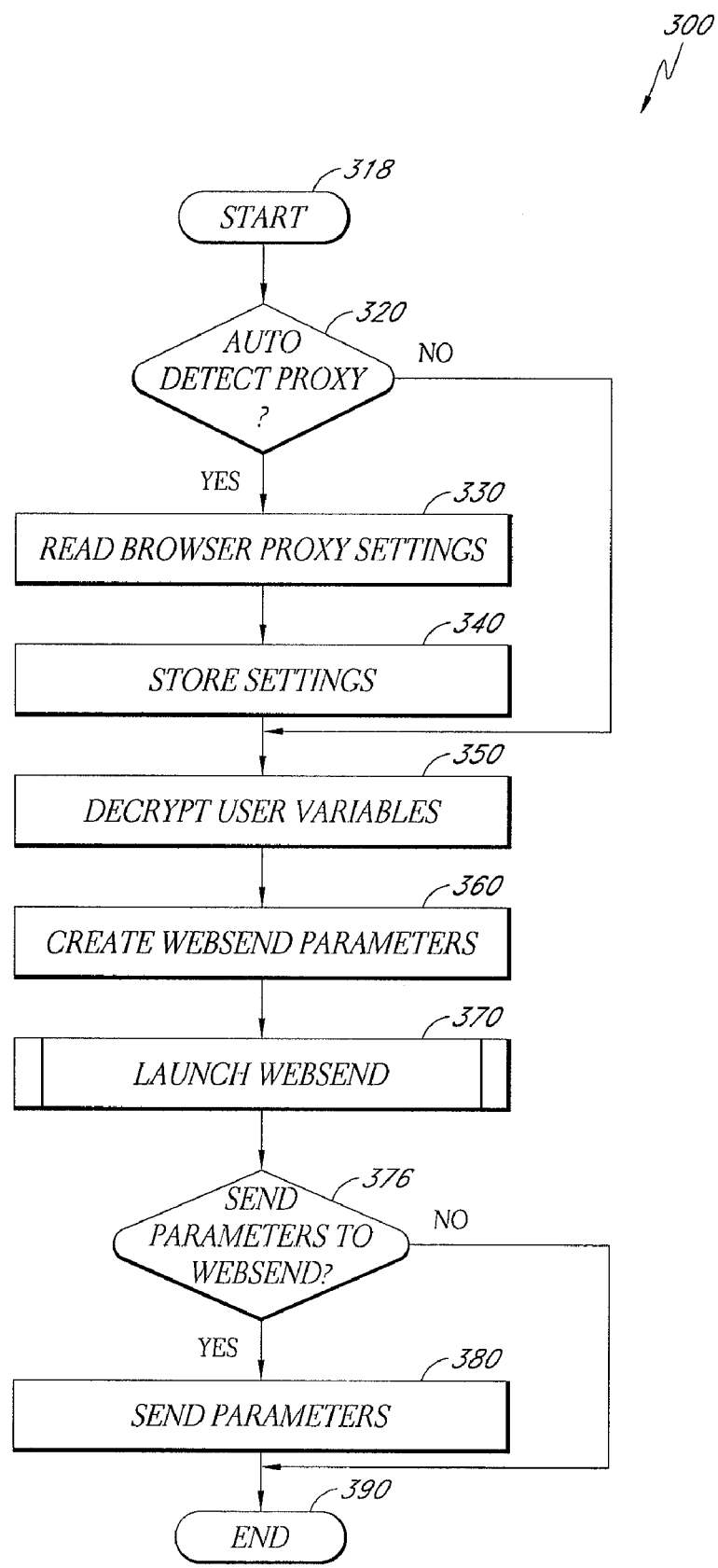
FIG. 5 is a flowchart illustrating a start websend process as performed by the client application processing module shown in FIG. 2.

FIG. 5 is a flowchart illustrating a start websend process 300 as performed by the transporter module 240 shown in FIG. 2. The start websend process 300 initiates the execution of the websend module 280, for example, when the client computer 30 is booted up or when the transporter module 240 begins executing. The start websend process 300 begins at a start block 318. The start websend process 300 includes a decision block 320 for determining whether to perform automatic proxy detection. If the start websend process 300 determines at the decision block 320 that automatic proxy detection is to be performed, the start websend process 300 continues to a block 330 to read the browser proxy settings. The start websend process 300 continues to a block 340 to store the proxy settings that were read at the block 330, for example in the proxy settings file 250 for subsequent access.

The start websend process 300 continues to a block 350 to decrypt user variables either after storing the proxy settings at the block 340 or if it is determined at the decision block 320 that automatic proxy detection is not to be performed. The user variables can include user login information that is encrypted for security reasons. The encrypted user variables are decrypted at the block 350 for insertion in script files in a readable format. The start websend process 300 continues to a block 360 to create websend parameters. At a block 370, the start websend process 300 launches the websend executable module to begin its program execution. At a decision block 376, the start websend process 300 determines whether to send the websend parameters that were created at the block 360 to the executing websend program. If it is determined at the block 376 to send the parameters, the start websend process 300 continues to a block 380 to send the parameters to the websend program. If it is determined at the block 376 not to send the parameters, or after the block 380, the start websend process 300 continues to an end block 390. The start websend process 300 terminates at the end block 390.

Figure 6:
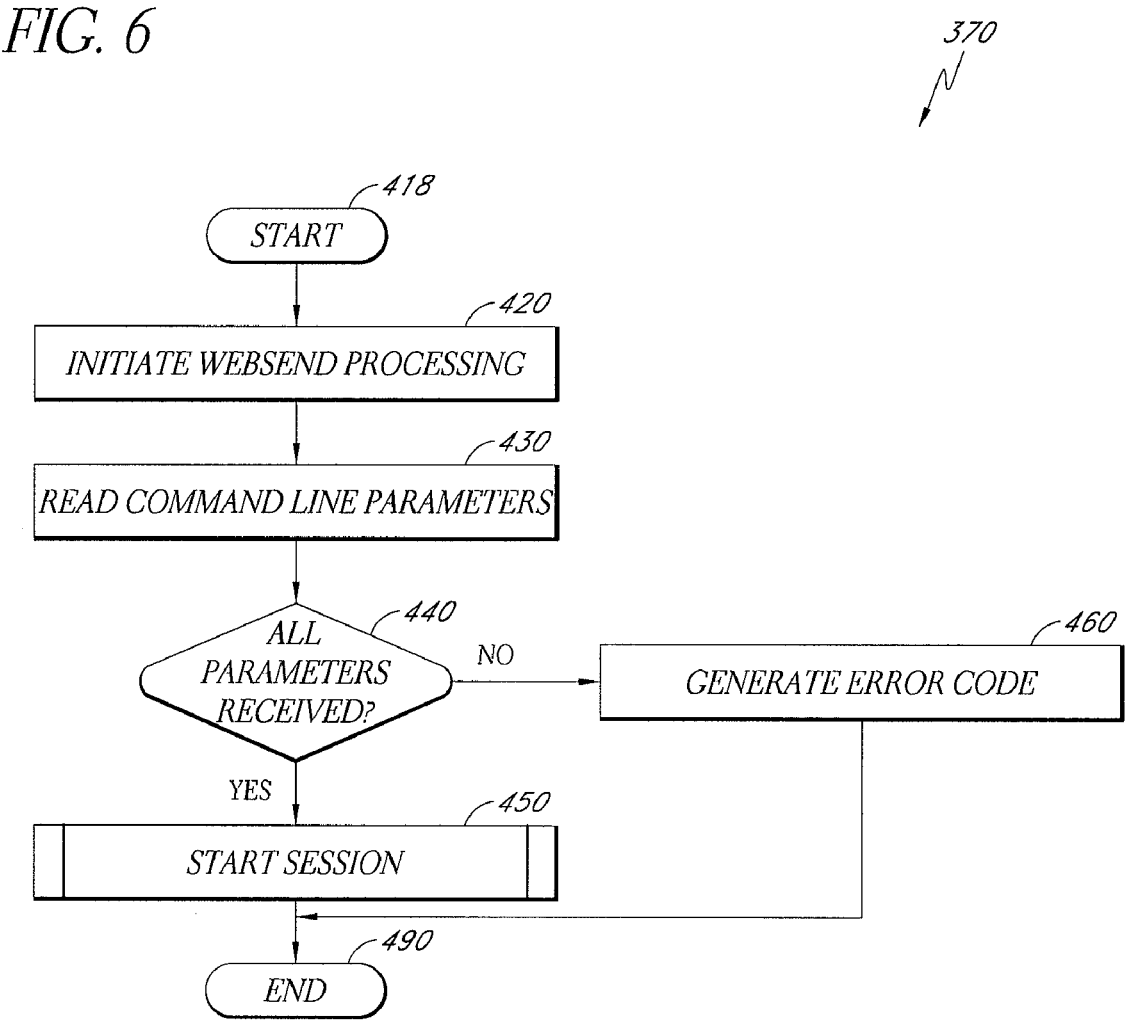
FIG. 6 is a flowchart illustrating a launch websend process of the start websend process in FIG. 5.

FIG. 6 is a flowchart illustrating a launch websend process 370 of the start websend process 300 in FIG. 5. The launch websend process 370 performs the processing for beginning the program execution of the websend executable module. As is common in computer processors, a program is initiated by adding it to a list of executing programs. Having been added to the list of executing programs, the program is allocated a certain amount of processing time for program execution, for example, by a task manager process executing as part of the operating system 210. The launch websend process 370 begins at a start block 418. The launch websend process 370 includes a block 420 to initiate processing of the websend executable.

The launch websend process 370 continues to a block 430 to read command line parameters. Executing programs are often able to access a command line text string used to initiate the program for reading options or parameters used to initiate the program. In the embodiment of FIG. 6, the launch websend process 370 reads parameters from the command line at the block 430. The launch websend process 370 continues to a decision block 440 to determine whether all command line parameters have been received. If it is determined at the decision block 440 that all parameters have been received, the launch websend process 370 continues to a block 450 to start the websend session. If, however, it is determined at the decision block 440 that all parameters have not been received, the launch websend process 370 continues to a block 460 to generate an error code indicating that not all parameters were received. After the completion of either the block 450 or the block 460, the launch websend process 370 continues to an end block 490. The launch websend process 370 terminates at the end block 490.

Figure 7:
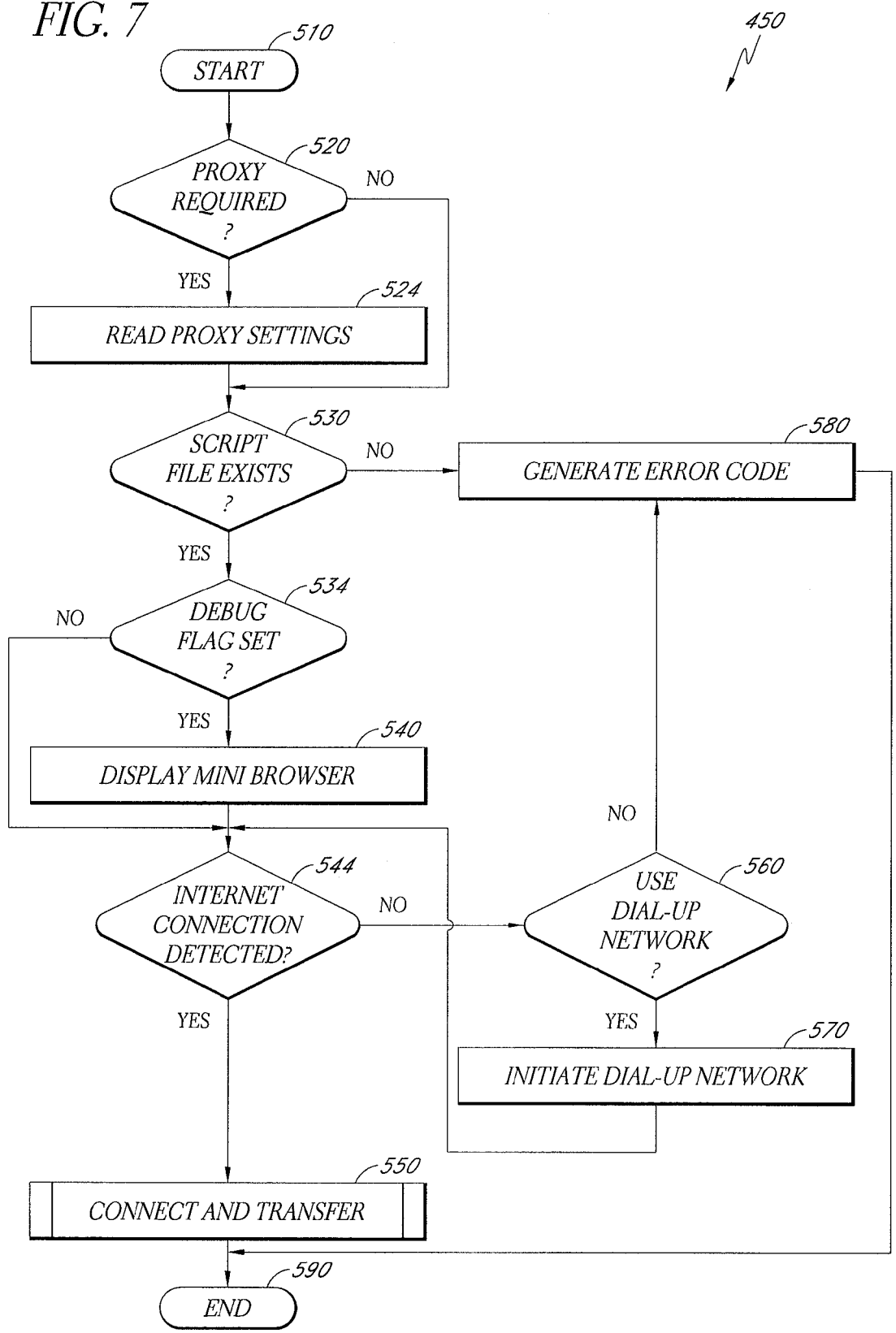
FIG. 7 is a flowchart illustrating a start session process of the launch websend process in FIG. 6.

FIG. 7 is a flowchart illustrating a start session process 450 of the launch websend process 370 in FIG. 6. The start session process 450 performs the processing to begin the current websend session. The start session process 450 begins at a start block 510. The start session process 450 includes a decision block 520 to determine whether reading of the proxy settings is required. If it is determined at the decision block 520 that the reading of the proxy settings is required, the start session process 450 continues to a block 524 to read the proxy settings. After the block 524, or if it is determined at the decision block 520 that the reading of the proxy settings is not required, the start session process 450 continues to a decision block 530 to determine whether a script file exists that describes how to interface with the bank website. If it is determined at the decision block 530 that a script file does exist, the start session process 450 continues to a decision block 534 to determine whether the debug flag is set. A debug flag indicates to a process that it is being executed in a debug mode, which is commonly used to instruct the process to display additional diagnostic or status information that can be useful to locate and correct bugs or other errors in the process.

If it is determined at the decision block 534 that the debug flag is set, the start session process 450 continues to a block 540 to display a mini browser, for example, to display the diagnostic or other status information that has been programmed into the process for display. After the block 540, or if it is determined at the decision block 534 that the debug flag is not set, the start session process 450 continues to a decision block 544 to determine whether a network, e.g., Internet, connection was detected, for example, by checking a status of a network interface card that is installed in the client computer 30, or by attempting to send a message to another device on the network and determining if a response is received at the client computer 30.

If it is determined at the decision block 544 that a network connection was detected, the start session process 450 continues to a block 550 to connect to one or more bank websites and prepare the websend module 280 for the transfer of files to or from the server computer 60 for the designated bank website(s). The start session process 450 can execute the connect and transfer processing of the block 550 iteratively in a looping manner until the websend program terminates. The connect and transfer processing module is described below with regard to FIG. 21. After the connect and transfer processing of the block 550, the start session process 450 continues to an end block 590.

If it is determined at the decision block 544 that the network connection is not detected, the start session process 450 continues to a decision block 560 to determine whether to use a dial-up network, for example, using a modem connected to the client computer 30 to connect to a dial-up internet service provider (ISP) to establish the network connection. If it is determined at the decision block 560 to use the dial-up network, the start session process 450 continues to a block 570 to initiate the dial-up network connection. After the block 570, the start session process 450 continues back to the decision block 544 to determine whether the network connection has become available since the last time its availability was checked. If it is determined at the decision block 560 not to use the dial-up network, or if it is determined at the decision block 530 that the script file does not exist, the start session process 450 continues to a block 580 to generate an error code indicating the error that has occurred so the error can be corrected if desired. After the block 580 to generate the error code, the start session process 450 continues to the end block 590. The start session process 450 terminates at the end block 590.

Figure 8:
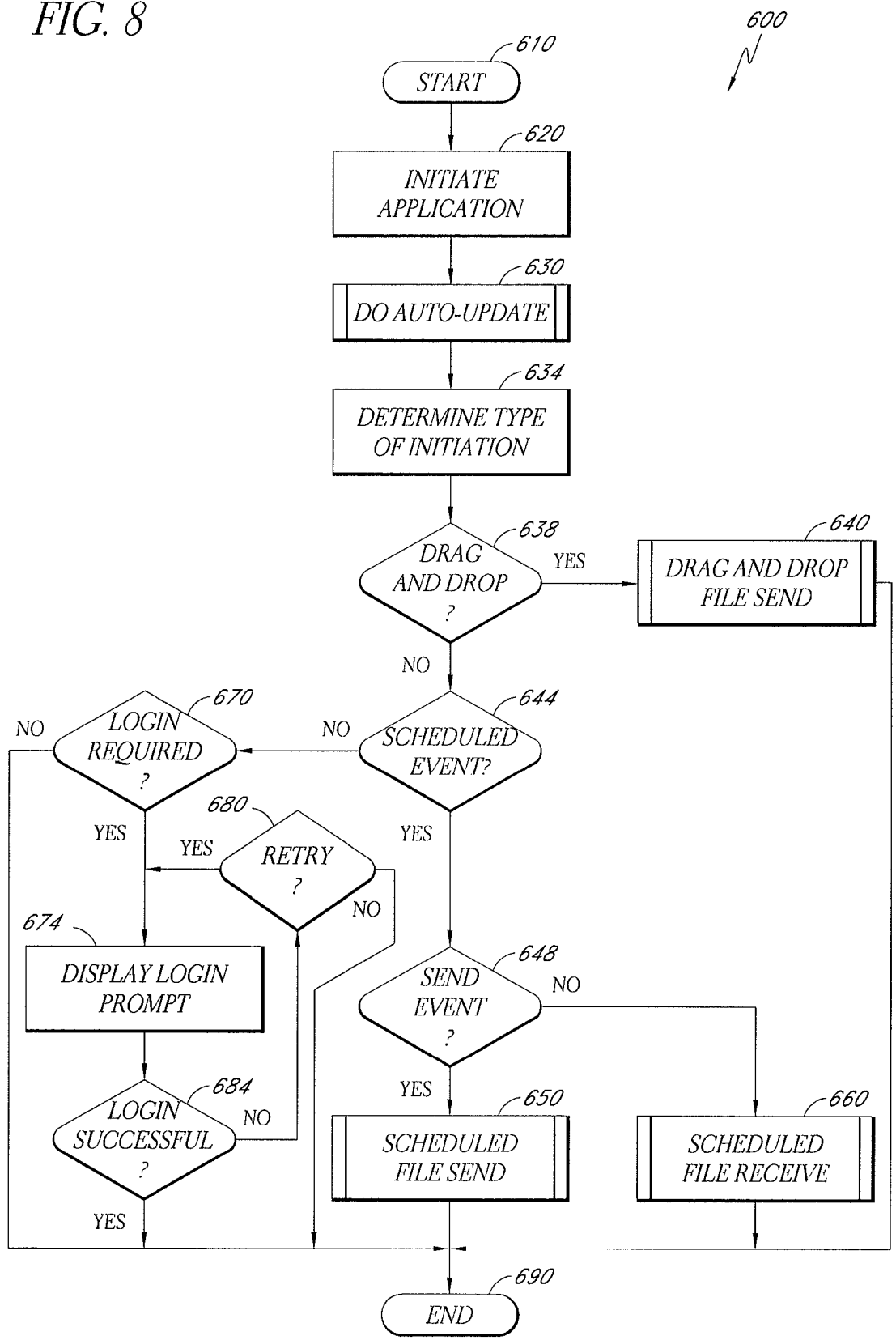
FIG. 8 is a flowchart illustrating a start transporter process for initiating the transporter module shown in FIG. 2.

FIG. 8 is a flowchart illustrating a start transporter process 600 for initiating the transporter module 240 shown in FIG. 2. The start transporter process 600 initiates the execution of the transporter module 240, for example, when the client computer 30 is booted up or when the user at the client computer 30 requests initiation of the transporter module 240. The start transporter process 600 begins at a start block 610. The start transporter process 600 includes a block 620 to initiate the execution of the application program for the transporter module 240. In some operating systems, initiating the executable program causes it to be added to the list of currently executing programs, which results in the program being allocated a certain amount of processing time for program execution.

The start transporter process 600 continues to an auto-update processing module 630 for automatically updating script files or profiles that describe how to interact with a particular bank website. The auto-update processing module 630 is described below with regard to FIG. 9. The start transporter process 600 continues to a block 634 to determine the type of program initiation that was used to start the execution of the transporter module 240. The start transporter process 600 continues to a decision block 638 to determine whether the type of program initiation was a drag and drop file operation. If it is determined at the block 638 that the transporter module 240 was initiated by a drag and drop file operation, the start transporter process 600 continues to a drag and drop file send processing module 640 for sending the file that was the subject of the drag and drop operation to the bank website via the websend module 280. The drag and drop file send processing module 640 is described below with regard to FIG. 10.

If it is determined at the decision block 638 that the transporter module 240 was not initiated by a drag and drop file operation, the start transporter process 600 continues to decision block 644 to determine whether the transporter module 240 was initiated by a scheduled event. If it is determined at the decision block 644 that the transporter module 240 was initiated by a scheduled event, the start transporter process 600 continues to a decision block 648 to determine whether the scheduled event is a send file event or a receive file event. If it is determined at the decision block 644 that the scheduled event is a send file event, the start transporter process 600 continues to a scheduled file send processing module 650 to send the file to the bank website via the websend module 280. If it is determined at the decision block 644 that the scheduled event is not a send file event, the start transporter process 600 continues to a scheduled file receive processing module 660 to receive the file from the bank website via the websend module 280. After the scheduled file send processing module 650, the scheduled file receive processing module 660, or the drag and drop file send processing module 640, the start transporter process 600 continues to an end block 690.

If it is determined at the decision block 644 that the transporter module 240 was not initiated by a scheduled event, the start transporter process 600 continues to a decision block 670 to determine whether the user has selected that a login is required to initiate the transporter module 240 and transfer file to and from the bank website. If it is determined at the decision block 670 that login is required, the start transporter process 600 continues to a block 674 to display the login prompt, for example, for the user to enter the user's login username and password information. The start transporter process 600 continues to a decision block 684 to determine whether the login was successful, for example, whether the username and password entered by the user at the login prompt are valid. If it is determined at the decision block 684 that the login was not successful, the start transporter process 600 continues to a decision block 680 to determine whether to allow the user to retry logging in by re-entering his or her username and password information. In some embodiments, the determination of whether to allow the user to retry entering their login information can involve determining whether a maximum number of allowed login retries has been exceeded.

If it is determined at the decision block 680 that login retry is allowed, the start transporter process 600 continues to the block 674 to again display the login prompt. If it is determined at the decision block 680 that login retry is not allowed, or if it is determined at the decision block 684 that the login was successful, or if it is determined at the decision block 670 that user login is not required, the start transporter process 600 continues to the end block 690. The start transporter process 600 terminates at the end block 690.

Figure 9:
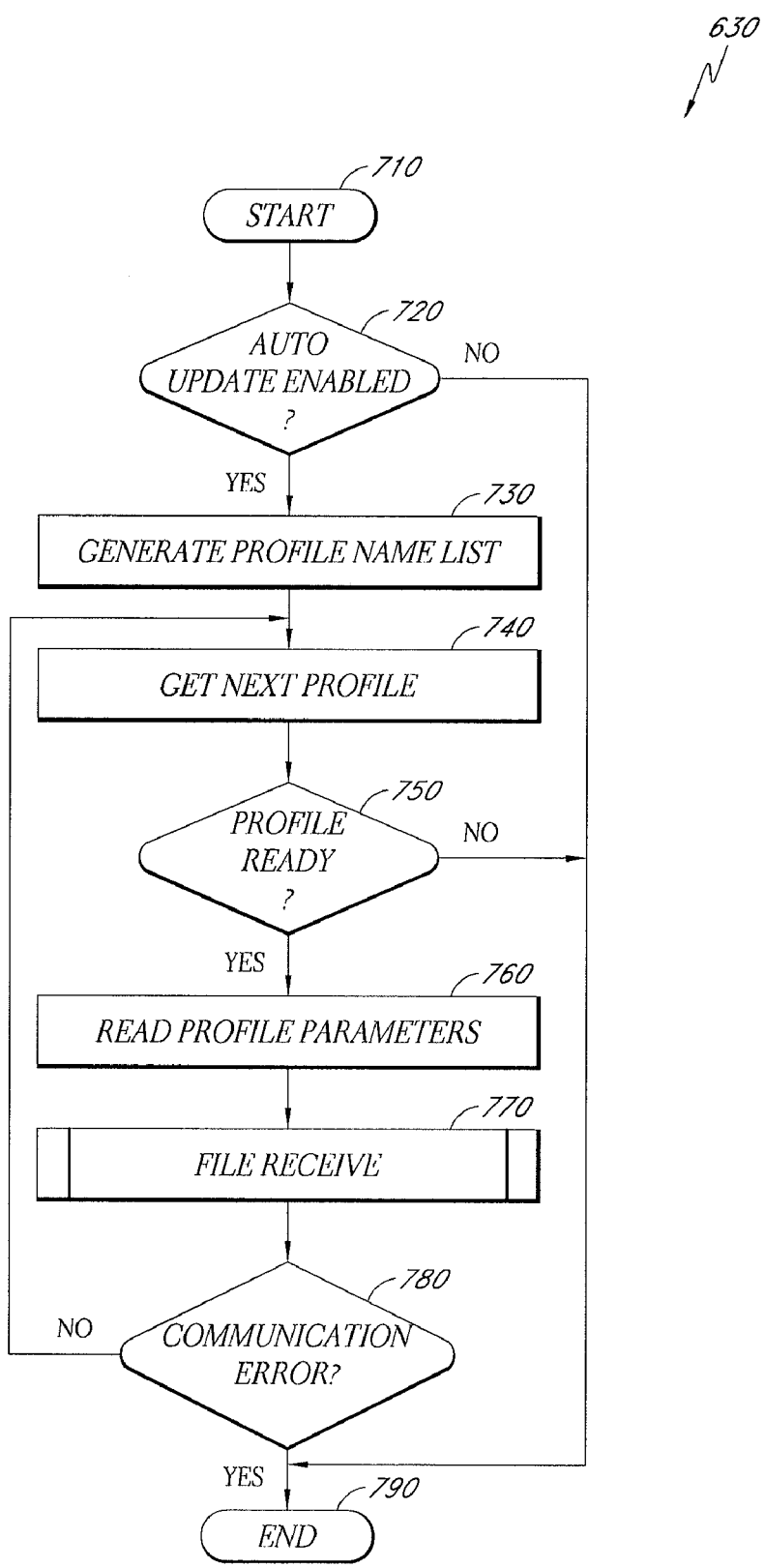
FIG. 9 is a flowchart illustrating an auto-update processing module of the start transporter process in FIG. 8.

FIG. 9 is a flowchart illustrating an auto-update processing module 630 of the start transporter process 600 in FIG. 8. The script files and profiles describe how to interface with the bank websites for sending and receiving files via the Internet. The auto-update processing module 630 automatically checks if any of the script files or profiles have been updated, and if so, downloads them from the data center computer or another server computer. This relieves the client from remembering to download updates and spending the time to request the updates.

The auto-update processing module 630 begins at a start block 710. The auto-update processing module 630 includes a decision block 720 to determine whether the auto-update operation has been enabled. If it is determined at the decision block 720 that the auto-update operation has been enabled, the auto-update processing module 630 continues to a block 730 to generate a list of profile names to check for updated versions to be downloaded. The auto-update processing module 630 continues to a block 740 to get the next profile from the list of profile names. At a decision block 750, the auto-update processing module 630 determines whether an updated profile is ready for downloading. If it is determined at the decision block 750 that the profile is ready, the auto-update processing module 630 continues to a block 760 for reading the profile parameters, and to a file receive processing module 770 for receiving the updated profile. The file receive processing module is described below with regard to FIG. 19.

At a decision block 780, the auto-update processing module 630 determines whether a communication error has occurred while the file receive processing module 770 downloads the profile. If it is determined at the decision block 780 that a communication error has not occurred, the auto-update processing module 630 continues back to the block 740 for getting the next profile. If it is determined at the decision block 780 that a communication error has occurred, or if it is determined at the decision block 750 that the profile is not ready, or if it is determined at the decision block 720 that the auto-update operation is not enabled, the auto-update processing module 630 continues to an end block 790. The auto-update processing module 630 terminates at the end block 790.

Figure 10:
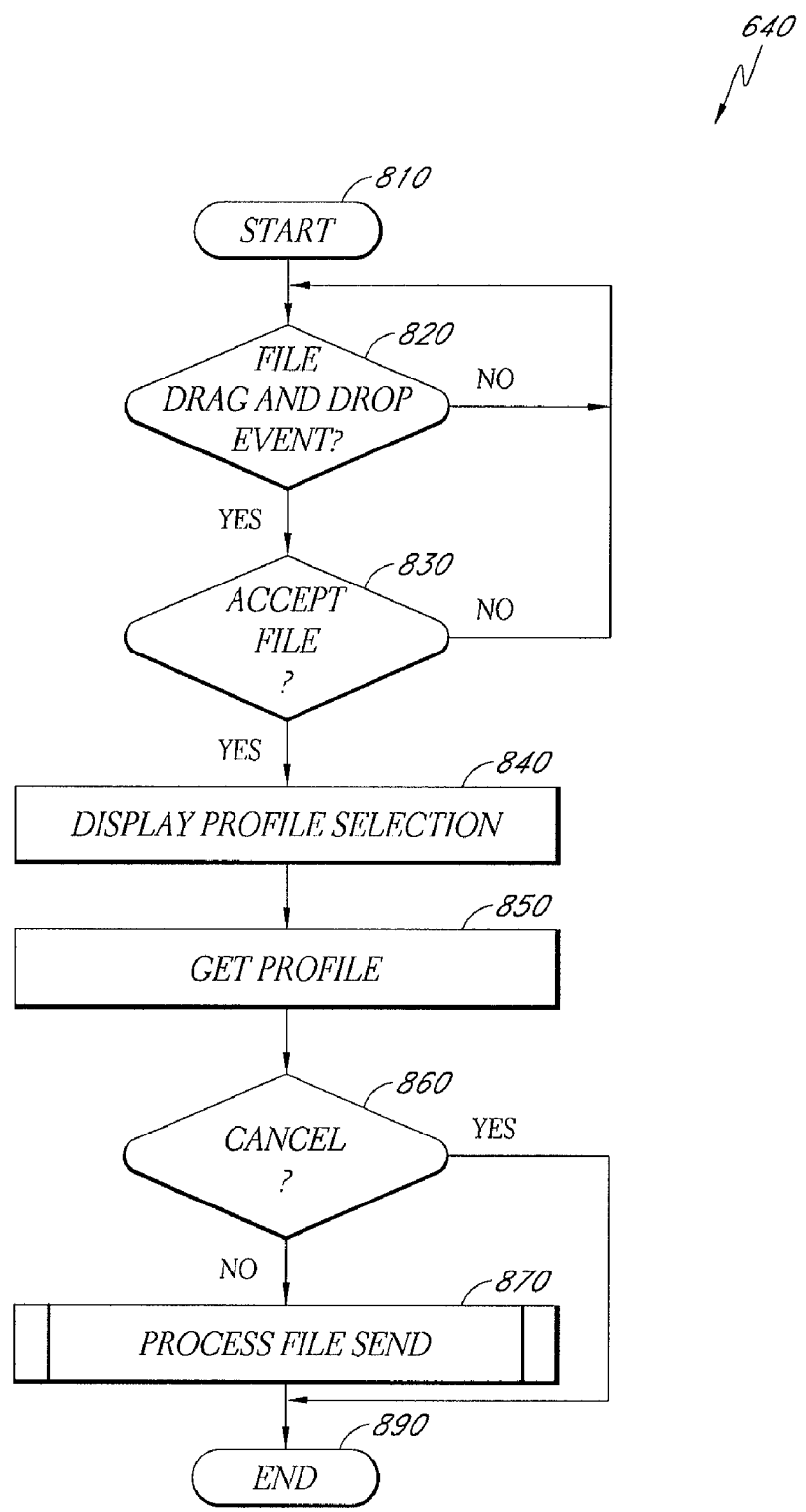
FIG. 10 is a flowchart illustrating a drag and drop file send processing module of the start transporter process in FIG. 8.

FIG. 10 is a flowchart illustrating a drag and drop file send processing module 640 of the start transporter process 600 in FIG. 8. Drag and drop operations refer to selecting a file using a computer mouse and a graphical user interface (GUI) of an operating system, for example, Windows, Macintosh OS and Linux, and dragging the file on top of a graphical representation (icon) of an application program. Users of the client computer 30 can select a file or files for transfer to the server computer 60 of a bank and drag and drop the file(s) onto an icon for the transporter module 240. In response, the transporter module 240 uploads the file(s) to the server computer in a semi-automated fashion. The user manually initiates the transfer with the drag and drop operation, but all the rest of the steps in transferring the file(s) occur automatically via the websend module 280.

The drag and drop file send processing module 640 begins at a start block 810. The drag and drop file send processing module 640 includes a decision block 820 to determine whether a drag and drop operation or event has been initiated by the user at the client computer 240. If it is determined at the decision block 820 that a drag and drop operation has occurred, the drag and drop file send processing module 640 continues to a decision block 800 to determine if the transporter module 240 is to accept the file that the user designated for the drag and drop file send operation.

If it is determined at the decision block 830 that the file is not to be accepted, or if it is determined at the decision block 820 that a drag and drop operation has not occurred, the drag and drop file send processing module 640 returns to the block 820 to continue waiting in a looping manner for a drag and drop operation to be initiated. If, however, it is determined at the decision block 830 that the file is to be accepted, the drag and drop file send processing module 640 continues to a block 840 to display the profile selection for the bank website to which the designated file is to be uploaded. At a block 850, the drag and drop file send processing module 640 gets the profile that describes how to interface with the particular bank website for the drag and drop file send operation.

At a decision block 860, the drag and drop file send processing module 640 determines whether to cancel the current drag and drop file send operation, for example, if there is a problem with the profile such that communication with the bank website would be unsuccessful. If it is determined at the decision block 860 that the drag and drop operation is not to be canceled, the drag and drop file send processing module 640 continues to a process file send processing module 870 to perform the transfer of the file to the bank server computer 60 via the websend module 280. After the process file send processing module 870 is executed, or if it is determined at the decision block 860 that the drag and drop operation is to be canceled, the drag and drop file send processing module 640 continues to and end block 890. The drag and drop file send processing module 640 terminates at the end block 890.

Figure 11:
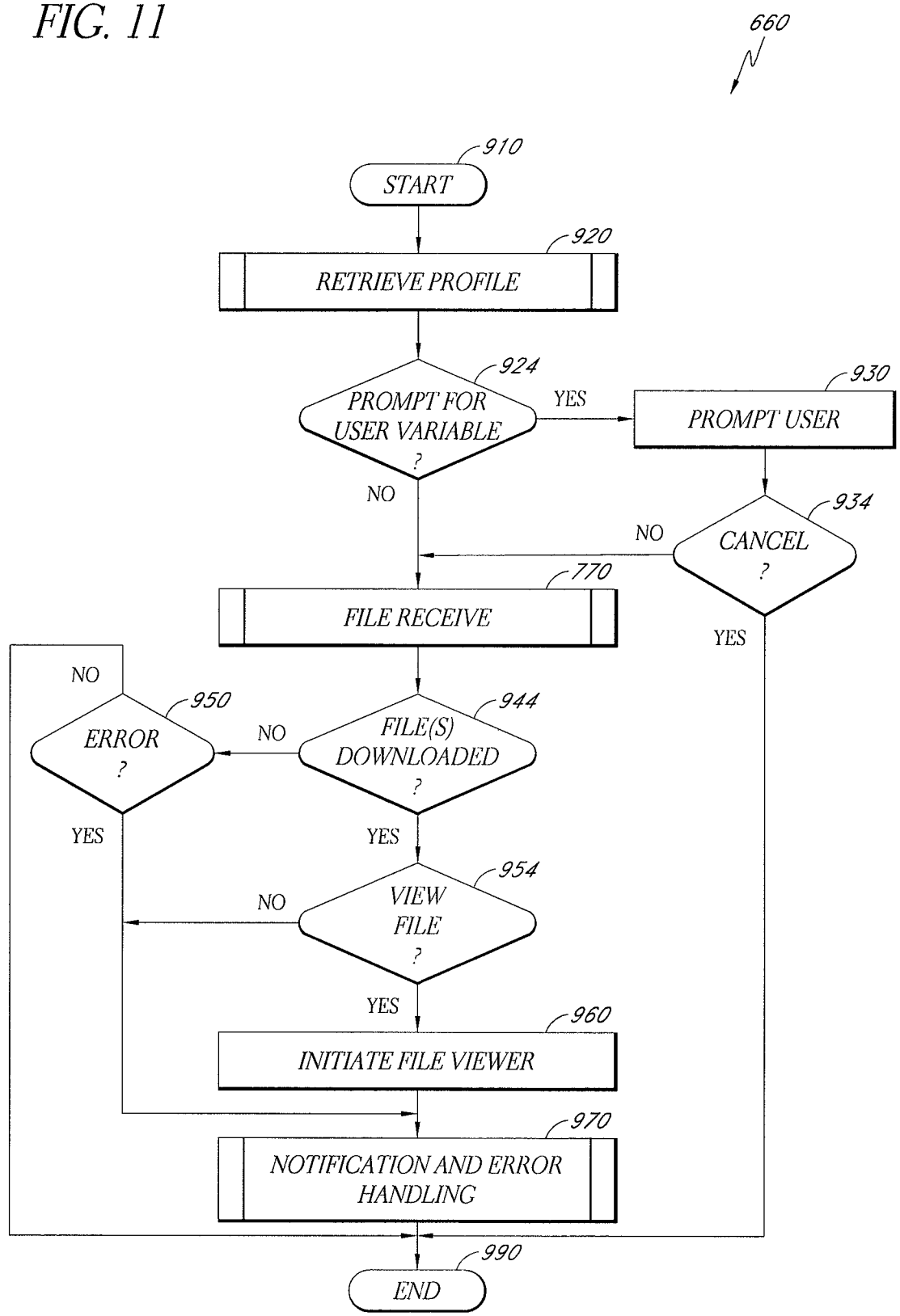
FIG. 11 is a flowchart illustrating a scheduled file receive processing module of the start transporter process in FIG. 8.

FIG. 11 is a flowchart illustrating a scheduled file receive processing module 660 of the start transporter process 600 in FIG. 8. The scheduled file receive processing module 660 receives files for downloading initiated by the server computer 280 for the bank website on a scheduled basis, for example, at a particular time each day, or initiates the file downloading itself from the client side (from the client computer 240). The scheduled file receive processing module 660 begins at a start block 910. The scheduled file receive processing module 660 includes a retrieve profile processing module 920 for reading the bank profile 290, decrypting the variables that are stored in the bank profile 290, and preparing the variables for use in a script file to execute in communicating with the bank website.

The scheduled file receive processing module 660 continues to a decision block 924 to determine whether to prompt the user of the client computer 30 for the user variable. Some users prefer to be prompted for user login information, and/or other website parameters, to prevent other users of the client computer 30 from logging into the bank website. In this case, the user is prompted to ensure that the user is in possession of the correct login information. If it is determined at the decision block 924 not to prompt for the user variable, the scheduled file receive processing module 660 continues to the file receive processing module 770 for receiving the downloaded file from the server computer 60 via the websend module 280. The file receive processing module 770 is described below with regard to FIG. 19. If it is determined at the decision block 924 to prompt for the user variable, the scheduled file receive processing module 660 continues to a block 930 to prompt the user, for example, by displaying a prompt message or pop-up window indicating the information that the user is requested to enter. The scheduled file receive processing module 660 continues to a decision block 934 to determine whether the user has selected at the user prompt at the block 930 to cancel the file receive operation. If it is determined at the decision block 934 to cancel the file receive processing, the scheduled file receive processing module 660 continues to an end block 990. However, if it is determined at the decision block 934 not to cancel the file receive operation, the scheduled file receive processing module 660 continues to the file receive processing module 770.

At a decision block 944, the scheduled file receive processing module 660 determines whether any files were downloaded by the file receive processing module 770. If it is determined at the decision block 944 that at least one file was downloaded, the scheduled file receive processing module 660 continues to a decision block 954 to determine whether to view any of the contents of the downloaded file. For example, if the downloaded file includes bank account balance information, the user at the client computer 30 could choose to view the current account balance. If it is determined at the decision block 954 to view the downloaded file(s), the scheduled file receive processing module 660 continues to a block 960 to initiate the file viewer process. In one embodiment, the file viewer process displays a pop-up window on the display screen of the client computer 30 for inspection and review by the user. Alternatively, the file viewer process can write the information to a log file for subsequent viewing by the user.

The scheduled file receive processing module 660 continues to a notification and error handling processing module 970 to log errors and occurrences of certain events or actions. The notification and error handling processing module 970 can log errors and notifications, for example, by writing them to a log file, displaying them on the display screen of the client computer 30, sending them via email to a user, sending them for printing on the printer 20, or the like. The notification and error handling processing module 970 is described below with regard to FIG. 14. After the notification and error handling processing module 970, the scheduled file receive processing module 660 continues to the end block 990.

If it is determined at the decision block 944 that no files were downloaded by the file receiving processing module 770, the scheduled file receive processing module 660 continues to a decision block 950 to determine whether an error has occurred during the download operation. If it is determined at the decision block 950 that a download error did occur, or if it is determined at the decision block 954 not to view the downloaded file(s), the scheduled file receive processing module 660 continues to the notification and error handling module 970 to record the notification or error for review, analysis and possibly fixing of the error. If, however, it is determined at the decision block 950 that a download error did not occur, the scheduled file receive processing module 660 continues to the end block 990. The scheduled file receive processing module 660 terminates at the end block 990.

Figure 12:
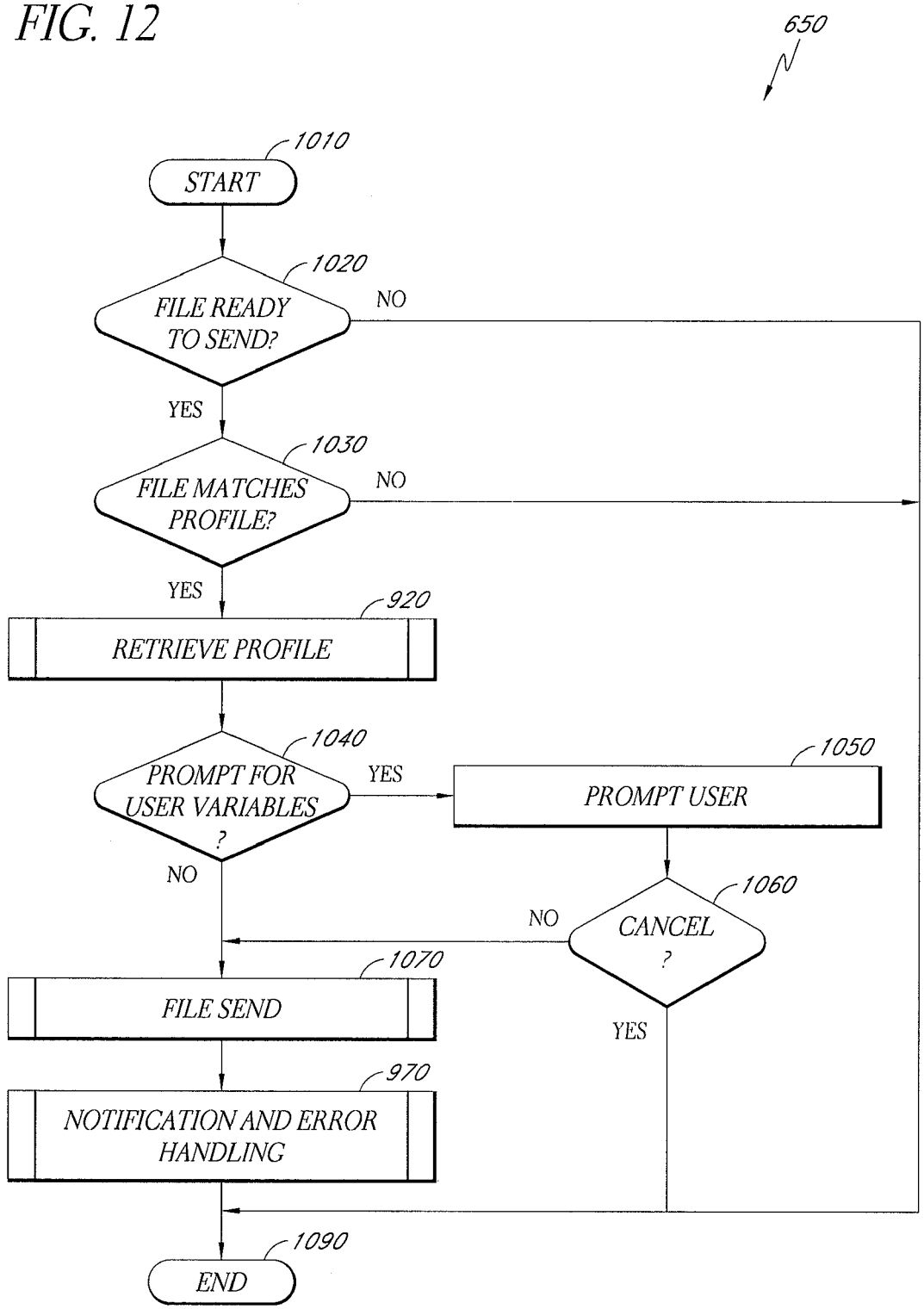
FIG. 12 is a flowchart illustrating a scheduled file send processing module of the start transporter process in FIG. 8.

FIG. 12 is a flowchart illustrating a scheduled file send processing module 650 of the start transporter process 600 in FIG. 8. The scheduled file send processing module 650 of the transporter module 240 sends files that have been scheduled for transfer from the client computer 30 to the server computer 60 via the websend module 280. For example, scheduling of file transfers can be set up to occur on an hourly basis, daily basis, weekly basis, monthly basis, or other scheduled time or interval. The scheduled file send processing module 650 begins at a start block 1010. The scheduled file send processing module 650 includes a decision block 1020 to determine whether the designated file is ready to send or upload to the web server 60.

If it is determined at the decision block 1020 that the file is ready to send, the scheduled file send processing module 650 continues to a decision block 1030 to determine whether the designated file to be sent matches the profile. If it is determined that the file does not match the desired profile or file format, then the file can optionally be sent to a data conversion engine (not shown). The data conversion engine can modify the file to fit the desired profile format, and transfer the file to the retrieve profile processing module 920. If it is determined at the decision block 1030 that the file matches the profile, the scheduled file send processing module 650 continues to the retrieve profile processing module 920 to get the profile. The operation of the retrieve profile processing module 920 is described below with regard to FIG. 17.

At a block 1040, the scheduled file send processing module 650 determines whether to prompt the user for user variables before sending the file to the web server 60. Users can specify that their login information not be stored in the user settings file 260, in which case the user is prompted for their login information and/or other website parameters to ensure that unauthorized users are unable to login to the bank website. If it is determined at the decision block 1040 not to prompt the user for user variables, the scheduled file send processing module 650 continues to a file send processing module 1070 to perform the operation of sending the file to the web server 60 via the websend module 280. The file send processing module 1070 is described below with regard to FIG. 18.

The file send processing module 650 continues to the notification and error handling processing module 970 for recording the occurrence of certain events and errors. The notification and error handling processing module 970 is described below with regard to FIG. 14. The file send processing module 650 continues to an end block 1090. If it is determined at the decision block 1020 that the file is not ready to be sent, or if it is determined at the decision block 1030 that the file does not match the profile, the file send processing module 650 continues to the end block 1090.

If it is determined at the decision block 1040 to prompt the user for entry of user variables, the file send processing module 650 continues to a block 1050 to prompt the user, for example, by displaying a pop-up window or other display prompt on the screen of the client computer 60. At a decision block 1060, the file send processing module 650 determines whether the user has selected to cancel the scheduled file send operation. If it is determined at the decision block 1060 that the user did not select to cancel the sending of the file, the file send processing module 650 continues to the file send processing module 1070 described above and with regard to FIG. 18. However, if it is determined at the decision block 1060 that the user did select to cancel the sending of the file, the file send processing module 650 continues to the end block 1090. The scheduled file send processing module 650 terminates at the end block 1090.

Figure 13:
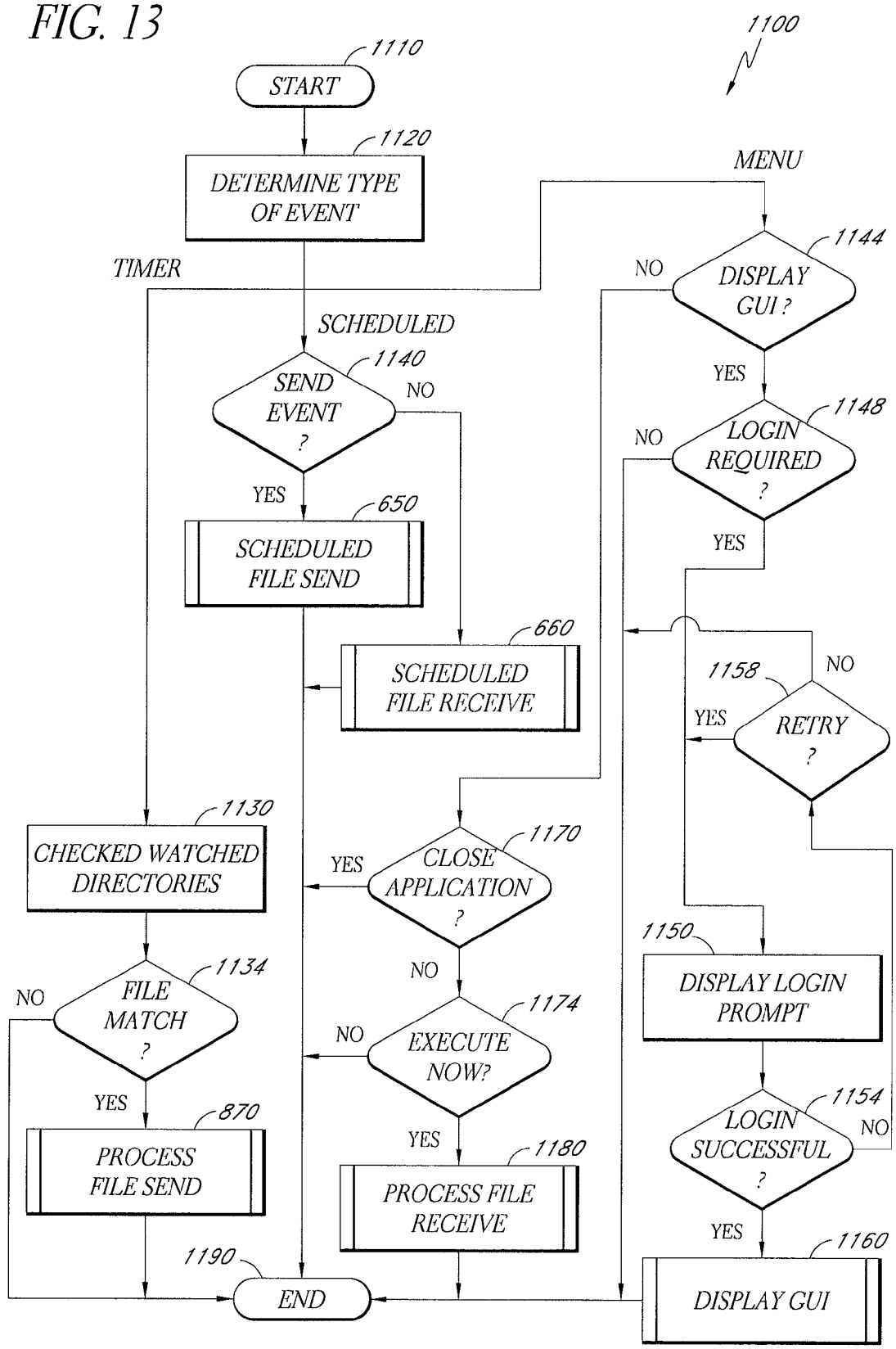
FIG. 13 is a flowchart illustrating an event processing module as executed by the transporter module in FIG. 2.

FIG. 13 is a flowchart illustrating an event processing module 1100 as executed by the transporter module 240 in FIG. 2. The embodiment of the event processing module 1100 shown in FIG. 13, also referred to as the idle processing module, performs the top level control flow of the transporter module 240. Once initiated and executing, certain embodiments of the transporter module 240 wait for something to do, such as transferring files in response to the occurrence of an event, a menu selection entered by the user, or a scheduled event, for example. The event processing module 1100 begins at a start block 1110. The event processing module 1100 includes a block 1120 to determine the type of event that occurred. If a timer event occurred, for example, the expiration of a system timer, some embodiments of the event processing module 1100 continue to a block 1130 to check watched directories. For example, a system timer that is provided by the operating system can be used to cause the event processing module 1100 to check whether certain designated events have occurred. One example of such an event is monitoring certain directories for the existence (or non-existence) of a file with a designated filename. In this way, an event could be set up to send a file having information on checks that have been written when a file named 'CHECK_INFO.DAT' is created in a designated directory on the hard disk drive. In other embodiments, other events can be set up, such as tasks executing on the computer with a designated task name, or receipt of an email from a designated sender, to a designated recipient, or with a designated subject.

The event processing module 1100 continues to a decision block 1134 to determine whether the filename of any file in the watched directory or directories matches the filename designated in an event. If it is determined at the decision block 1134 that a file exists in a watched directory, the event processing module 1100 continues to the process file send processing module 870 to send the appropriate file(s) to the server computer 60. After the process file send processing module 870, or if it is determined at the decision block 1134 that a file does not exist in a watched directory, the event processing module 1100 continues to an end block 1190.

If a scheduled event occurred as determined by the block 1120, the event processing module 1100 continues to a decision block 1140 to determine whether the event is a scheduled file send event or a scheduled file receive event. Scheduled events include events that the user can specify to execute at a certain time or date, or at a certain interval (for example, hourly, daily, weekly, monthly, and the like). If it is determined at the decision block 1140 that the event is a scheduled file send event, the event processing module 1100 continues to the scheduled file send processing module 650 for sending (uploading) the file(s) to the server computer 60. The operation of the scheduled file send processing module is described above with regard to FIG. 12. If it is determined at the decision block 1140 that the event is a scheduled file receive event, the event processing module 1100 continues to the scheduled file receive processing module 660 for receiving (downloading) the file(s) from the server computer 60. The operation of the scheduled file receive processing module is described above with regard to FIG. 11. After execution of either the scheduled file send processing module 650 or the scheduled file receive processing module 660, the event processing module 1100 continues to the end block 1190.

If a menu event occurred as determined by the block 1120, the event processing module 1100 continues to a decision block 1144 to determine whether to display the GUI. If the GUI is to be displayed, at a decision block 1148 the event processing module 1100 determines whether login is required. If login is required as determined by the decision block 1148, the login prompt is displayed at a block 1150 at which the user enters the user's login information. At a decision block 1154, the event processing module 1100 determines whether the login was successful using the information entered by the user in response to the login prompt displayed at the block 1150. If the login was successful as determined at the decision block 1154, the GUI is displayed at a block 1160 and the event processing module 1100 continues to the end block 1190.

If it is determined at the decision block 1148 that user login is not required, the event processing module 1100 displays the GUI at the block 1160 and continues to the end block 1190. If it is determined at the decision block 1154 that the login was not successful with the login information entered by the user, the event processing module 1100 continues to a decision block 1158 to determine whether to retry the login. If it is determined at the decision block 1158 that login is to be retried, the event processing module 1100 continues to display the login prompt at the block 1150. If, however, it is determined at the decision block 1158 that login is not to be retried, for example, if a maximum number of retries has been exceeded, the required login is determined to be unsuccessful and the event processing module 1100 continues to the end block 1190.

If it is determined at the decision block 1144 not to display the GUI, the event processing module 1100 determines at a block 1170 whether to terminate execution of one or both of the transporter module 240 and websend module 280 applications. If it is determined at the decision block 1170 not to close either application from execution, the event processing module 1100 continues to a decision block 1174 to determine whether to execute a process file receive operation at the present time. If it is determined at the decision block 1174 to execute the operation presently, the event processing module 1100 continues to the process file receive processing module 1180 and continues to the end block 1190. If it is determined at the decision block 1170 to close the application(s) at the present time, or if it is determined at the decision block 1174 not to execute the file receive operation presently, the event processing module 1100 continues to the end block 1190. The event processing module 1100 terminates at the end block 1190.

Figure 14:
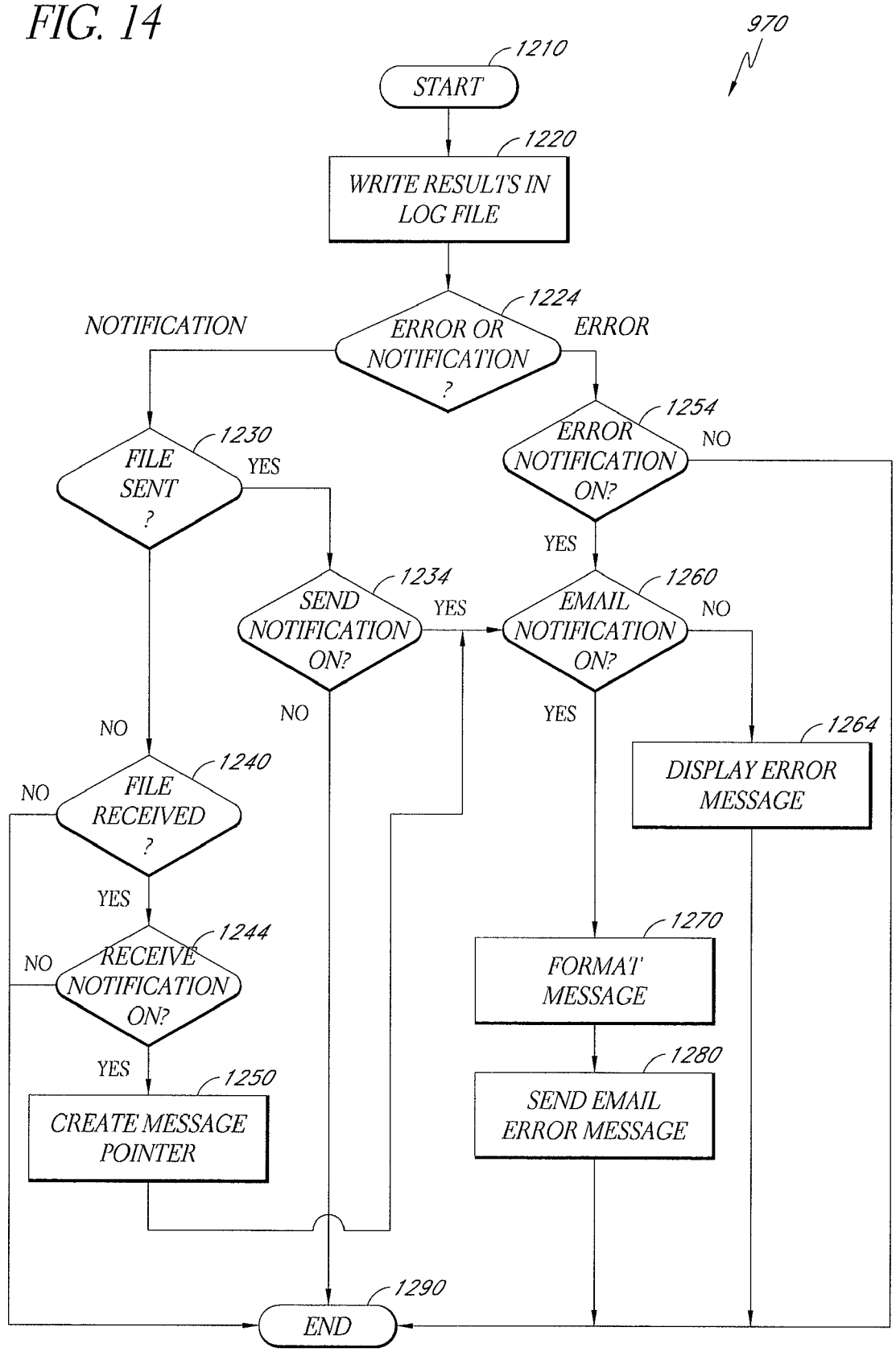
FIG. 14 is a flowchart illustrating a notification and error handling processing module invoked by, for example, the scheduled file receive processing module in FIG. 11, the scheduled file send processing module in FIG. 12, the process file receive processing module in FIG. 15, and the process file send processing module in FIG. 16.
Figure 15:
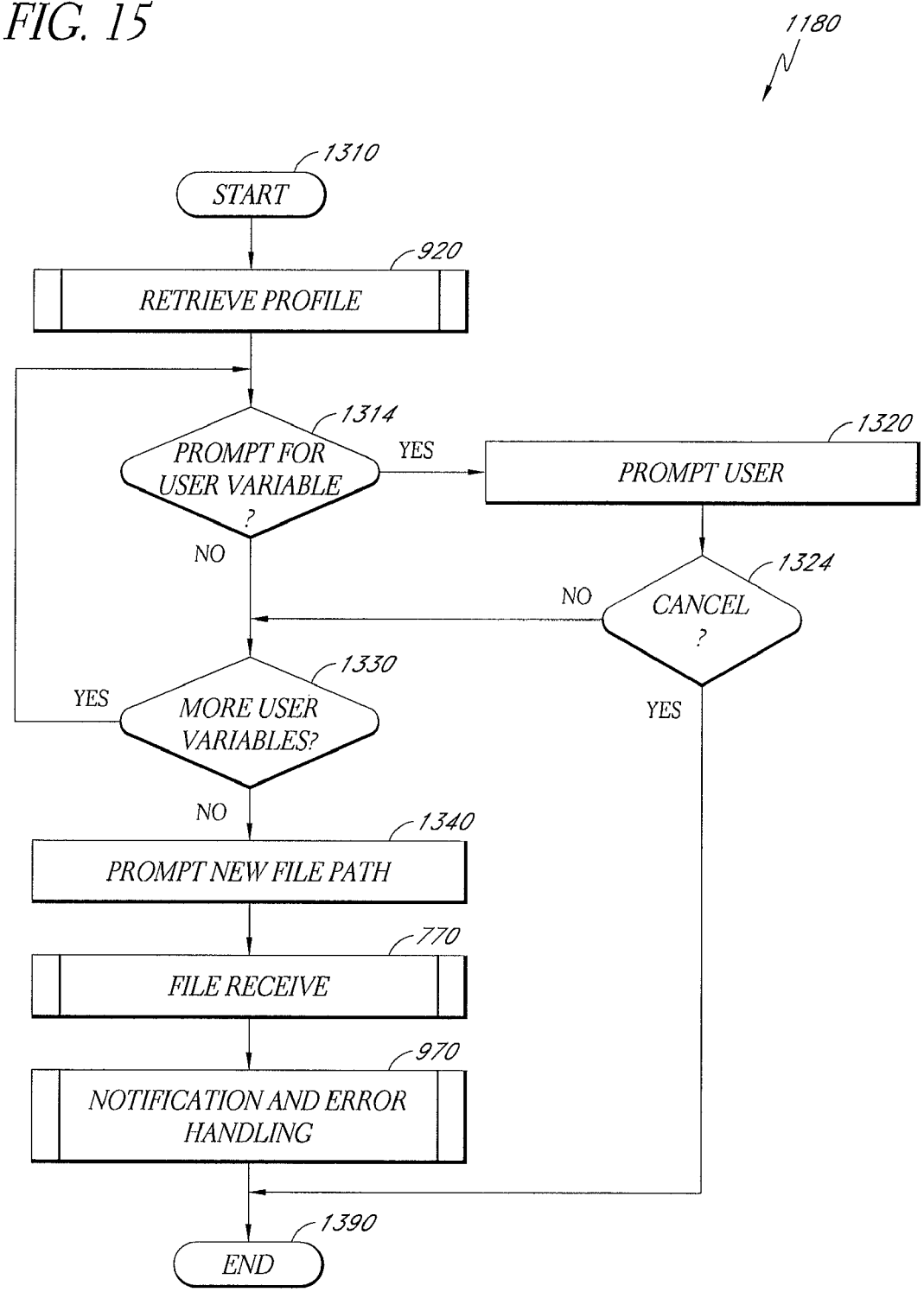
FIG. 15 is a flowchart illustrating a process file receive processing module invoked by the event processing module shown in FIG. 13.
Figure 16:
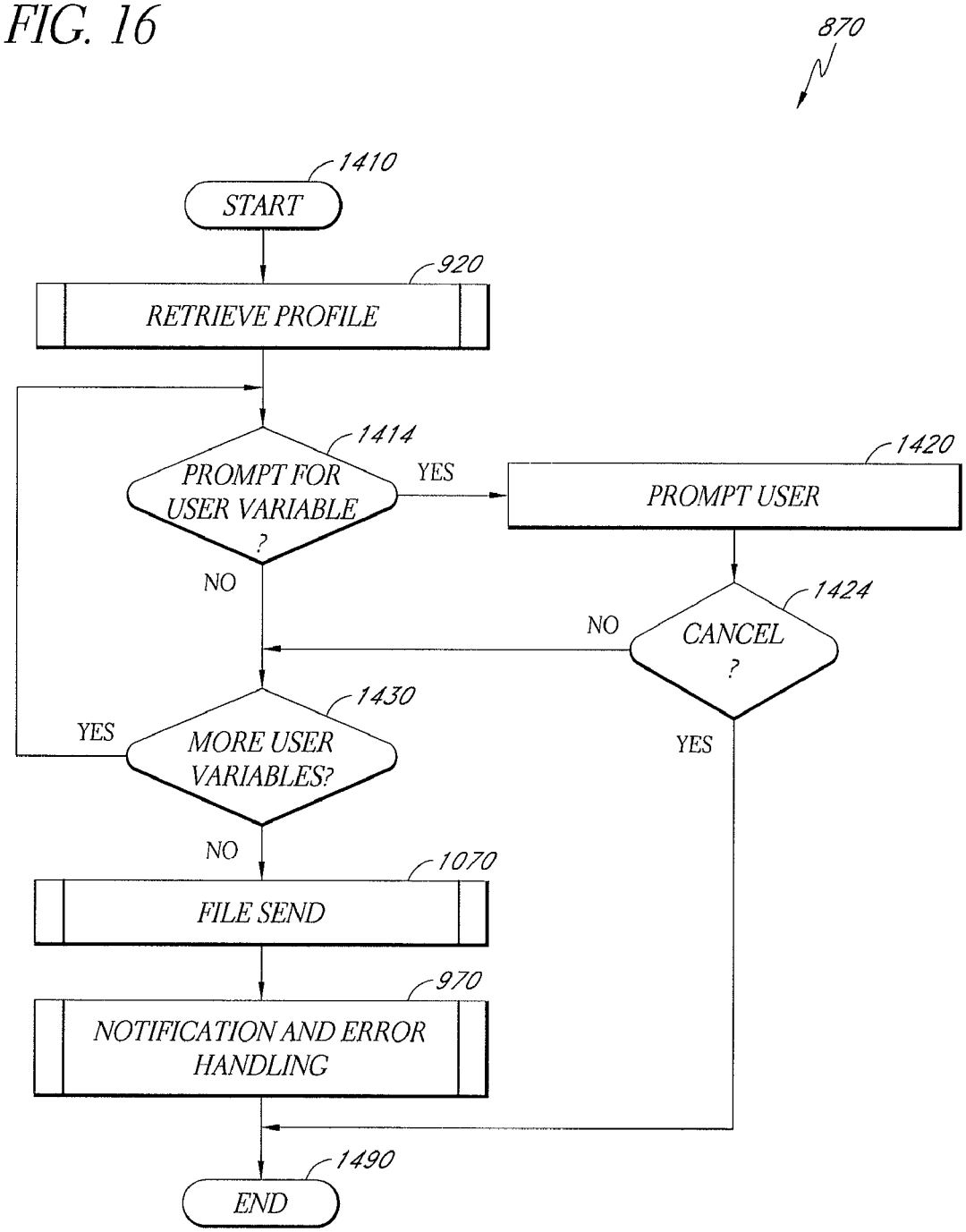
FIG. 16 is a flowchart illustrating a process file send processing module invoked by the event processing module shown in FIG. 13.

FIG. 14 is a flowchart illustrating a notification and error handling processing module 970 invoked by the scheduled file receive processing module 660 in FIG. 11, the scheduled file send processing module 650 in FIG. 12, the process file receive processing module 1180 in FIG. 15, and the process file send processing module 870 in FIG. 16. During operation of the file transfer system 200, various errors and other noteworthy occurrences are encountered that are recorded for review, analysis or attention by the user or other personnel as required. For example, the notifications or errors can be recorded to one or more log files, sent to a user in an email message, displayed on the screen of the client computer 30, or printed on the printer 20, to name just a few.

The notification and error handling processing module 970 begins at a start block 1210. The notification and error handling processing module 970 includes a block 1220 to write the results (notification or error message) in the log file or to another output device. At a decision block 1224, the notification and error handling processing module 970 determines whether an error or notification is being logged. If a notification is being logged, a decision block 1230 determines whether the notification is for the sending of a file to the server computer 60. If the notification is for the sending of a file, a decision block 1234 determines whether send notification logging is on (enabled). If send notification is not on (disabled), the notification and error handling processing module 970 continues to an end block 1290. If it is determined at the decision block 1230 that the notification is not for the sending of a file, the notification and error handling processing module 970 continues to a decision block 1240 to determine whether the notification is for the receipt of a file. If notification is for receipt, a decision block 1244 determines whether receive notification logging is on (enabled). If receive notification is on, at a block 1250 a file pointer is created. The file pointer is used to select the message template which it is to use for the notification. The message template can be a generic email message, fax outline or pager message. After the block 1250, or if it is determined at the decision block 1234 that send notification is on, the notification and error handling processing module 970 continues to a decision block 1260 (see below). If it is determined at the decision block 1240 that the notification is not for file receipt, or it is determined at the decision block 1244 that the receive notification is not on (disabled), the notification and error handling processing module 970 continues to the end block 1290.

However, if it is determined at the decision block 1224 that an error is being logged, the notification and error handling processing module 970 continues to a block 1254 to determine whether error notification is on (enabled). If error notification is on, a decision block 1260 determines whether notification by email is on. If email notification is on, a corresponding email message with the error notification is formatted at a block 1270. At a block 1280, the email message that was formatted at the block 1270 is sent to one or more users of the client computer 30. After the block 1280, or if it is determined at the decision block 1254 that error notification is not on (disabled), the notification and error handling processing module 970 continues to the end block 1290. If it is determined at the decision block 1260 that email notification is not on, an error message is displayed or sent to a log file at a block 1264, and the notification and error handling processing module 970 continues to the end block 1290. The notification and error handling processing module 970 terminates at the end block 1290.

FIG. 15 is a flowchart illustrating a process file receive processing module 1180 invoked by the event processing module 1100 shown in FIG. 13. The process file receive processing module 1180 receives files downloaded from the server computer 60 to the client computer 30. Downloaded files can be sent at the initiation of the bank website of the server computer 60 by a remote action request, or initiated from the client computer 30 by a file download request. The process file receive processing module 1180 begins at a start block 1310. The process file receive processing module 1180 continues to the retrieve profile processing module 920 as described below with regard to FIG. 17. At a decision block 1314, the process file receive processing module 1180 determines whether to prompt the user for a user variable. Users can specify that their login information not be stored in the user settings file 260, in which case the user is prompted for their login information to ensure that unauthorized users are unable to login to the bank website. If it is determined not to prompt for a user variable, a decision block 1330 determines whether there are more user variables to prompt the user for. If there are more user variables, the process file receive processing module 1180 continues back to the decision block 1314 to prompt the user for user variables.

If it is determined at the decision block 1314 to prompt the user for a user variable, the process file receive processing module 1180 prompts the user at a block 1320, and continues to a decision block 1324 to determine whether the user selected to cancel the receive file processing operation. If the user selected to cancel the file receive operation, the process file receive processing module 1180 continues to an end block 1390. If it is determined at the decision block 1324 not to cancel the file receive operation, the process file receive processing module 1180 continues to the decision block 1330 to determine whether there are more user variables to prompt the user for.

If there are no more user variables to prompt the user for, the process file receive processing module 1180 prompts for a new file path at a block 1340. The downloaded files can be placed in predetermined directories on the hard drive at the client computer system 30, or placed in the directory identified by the user at the block 1340. The process file receive processing module 1180 continues to the file receive processing module 770 for receiving the file from the server computer 60 for the bank website as described below with regard to FIG. 19. At the notification and error handling processing module 970, a file received notification message is sent as described above with regard to FIG. 14. The process file receive processing module 1180 terminates at the end block 1390.

FIG. 16 is a flowchart illustrating a process file send processing module 870 invoked by the event processing module 1100 shown in FIG. 13. The process file send processing module 870 sends files to be uploaded to the server computer 60 from the client computer 30. Uploaded files can be sent at the initiation of the client computer 30 by a file upload request, for example, from a scheduled event, timer event, or drag and drop file operation. In addition, the server computer 60 for the bank website can initiate the file upload process, for example, by a remote action request. The process file send processing module 870 begins at a start block 1410. The process file send processing module 870 continues to the retrieve profile processing module 920 as described below with regard to FIG. 17. At a decision block 1414, the process file send processing module 870 determines whether to prompt the user for a user variable. Users can specify that their login information not be stored in the user settings file 260, in which case the user is prompted for their login information to ensure that unauthorized users are unable to login to the bank website. If it is determined not to prompt for a user variable, a decision block 1430 determines whether there are more user variables to prompt the user for. If there are more user variables, the process file send processing module 870 continues back to the decision block 1414 to prompt the user for more user variables.

If it is determined at the decision block 1414 to prompt the user for a user variable, the process file send processing module 870 prompts the user at a block 1420, and continues to a decision block 1424 to determine whether the user selected to cancel the send file processing operation. If the user selected to cancel the file send operation, the process file send processing module 870 continues to an end block 1490. If it is determined at the decision block 1424 not to cancel the file send operation, the process file send processing module 870 continues to the decision block 1430 to determine whether there are more user variables to prompt the user for.

If there are no more user variables to prompt the user for, the process file send processing module 870 continues to the file send processing module 1070 for sending the file to the server computer 60 for the bank website as described below with regard to FIG. 18. At the notification and error handling processing module 970, a file sent notification message is sent as described above with regard to FIG. 14. The process file send processing module 870 terminates at the end block 1490.

Figure 17:
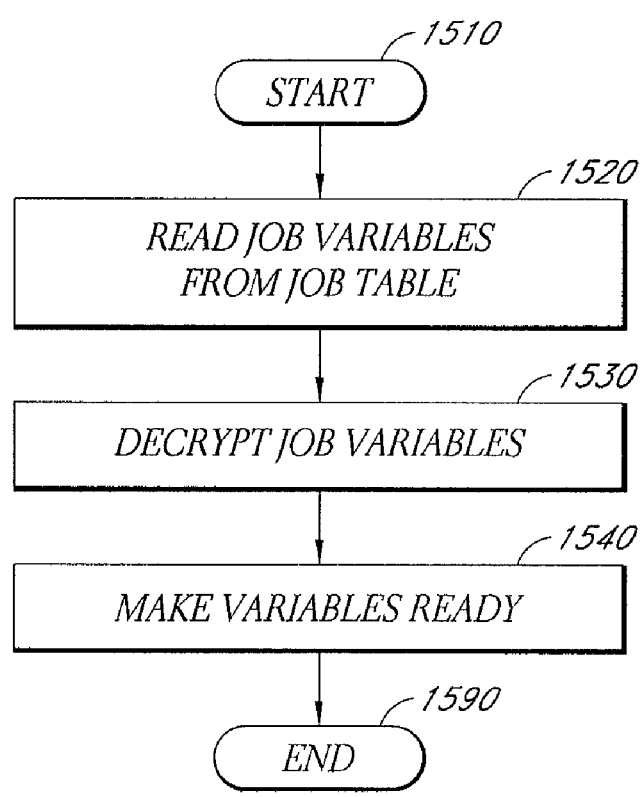
FIG. 17 is a flowchart illustrating a retrieve profile processing module as invoked by the scheduled file receive processing module shown in FIG. 11, the scheduled file send processing module shown in FIG. 12, the process file receive processing module shown in FIG. 15, and the process file send processing module shown in FIG. 16.

FIG. 17 is a flowchart illustrating the retrieve profile processing module 920 as invoked by the scheduled file receive processing module 660 shown in FIG. 11, the scheduled file send processing module 650 shown in FIG. 12, the process file receive processing module 1180 shown in FIG. 15, and the process file send processing module 870 shown in FIG. 16. The retrieve profile processing module 920 reads the bank profile 290, decrypts the login or other sensitive information, and prepares the job variables for use by the websend module 280 in the file transfer process. The retrieve profile processing module 920 begins at a start block 1510. The retrieve profile processing module 920 includes a block 1520 to read the job variables from the job table. The retrieve profile processing module 920 continues to a block 1530 to decrypt the job variables that are stored in the bank profile 290 in an encrypted format. At a block 1540, the retrieve profile processing module 920 makes the variables ready for use by the websend module 280 in the file transfer operation. The retrieve profile processing module 920 terminates at the end block 1590.

Figure 18:
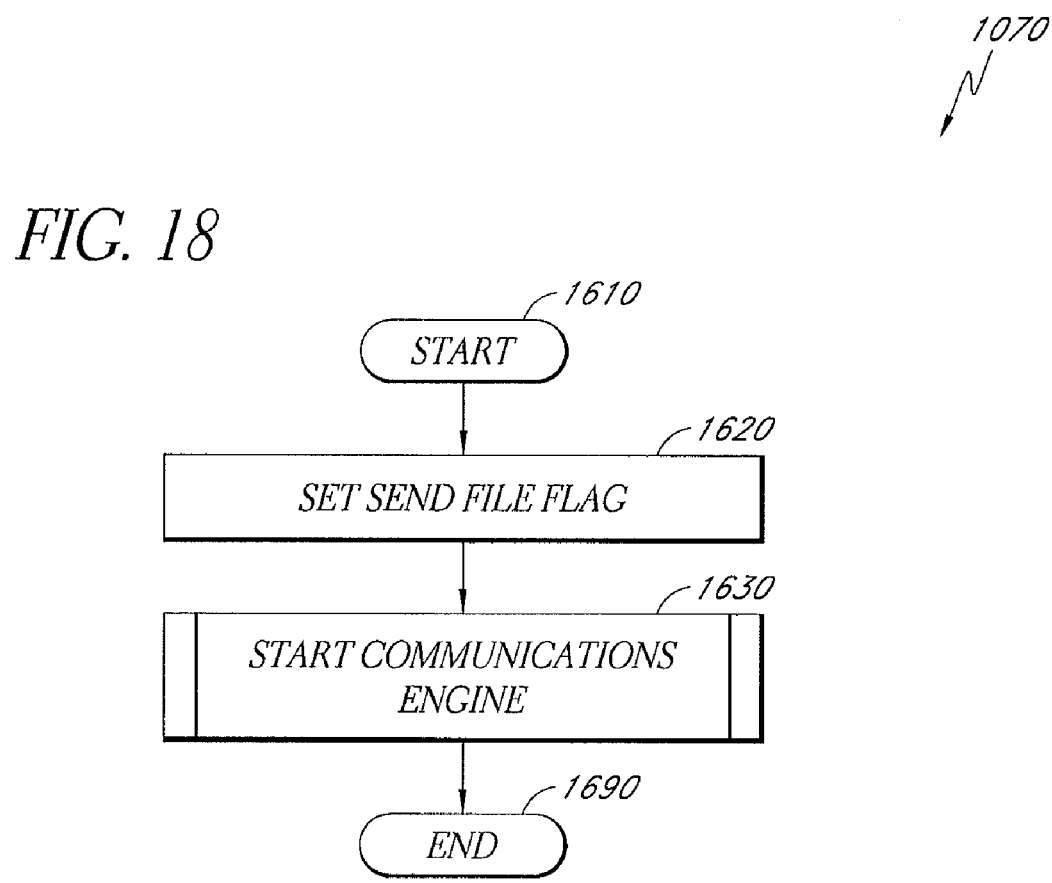
FIG. 18 is a flowchart illustrating a file send processing module as invoked by the scheduled file send processing module shown in FIG. 12 and the process file send processing module shown in FIG. 16.

FIG. 18 is a flowchart illustrating the file send processing module 1070 as invoked by the scheduled file send processing module 650 shown in FIG. 12 and the process file send processing module 870 shown in FIG. 16. The file send processing module 1070 communicates the file send operation from the transporter module 240 to the websend module 280 for sending files from the client computer 30 to the server computer 60 for the bank website. The file send processing module 1070 begins at a start block 1610. The file send processing module 1070 includes a block 1620 to set the flag indicating that the file transfer is a file send operation. The file send processing module 1070 continues to a start communications engine processing module 1630 for communicating the file transfer command to the websend module 280. The operation of the start communications engine processing module 1630 is described below with regard to FIG. 20. The file send processing module 1070 terminates at the end block 1690.

Figure 19:
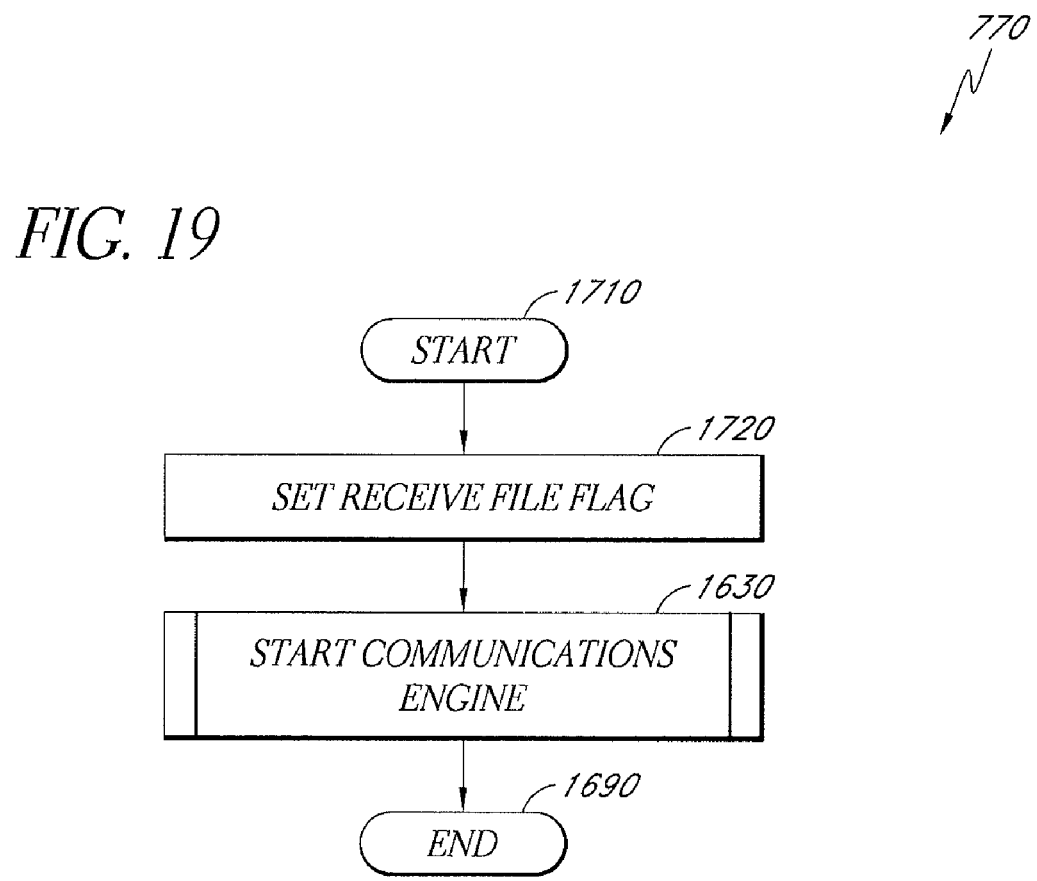
FIG. 19 is a flowchart illustrating a file receive process of the auto-update processing module shown in FIG. 9, the scheduled file receive processing module shown in FIG. 11, and the process file receive process shown in FIG. 15.

FIG. 19 is a flowchart illustrating a file receive processing module 770 as invoked by the auto-update processing module 630 shown in FIG. 9, the scheduled file receive processing module 660 shown in FIG. 11, and the process file receive processing module 1180 shown in FIG. 15. The file receive processing module 770 communicates the file receive operation from the transporter module 240 to the websend module 280 for receiving files at the client computer 30 from the server computer 60 for the bank website. The file receive processing module 770 begins at a start block 1710. The file receive processing module 770 includes a block 1720 to set the flag indicating that the file transfer is a file receive operation. The file receive processing module 770 continues to a start communications engine processing module 1630 for communicating the file transfer command to the websend module 280. The operation of the start communications engine processing module 1630 is described below with regard to FIG. 20. The file receive processing module 770 terminates at the end block 1790.

Figure 20:
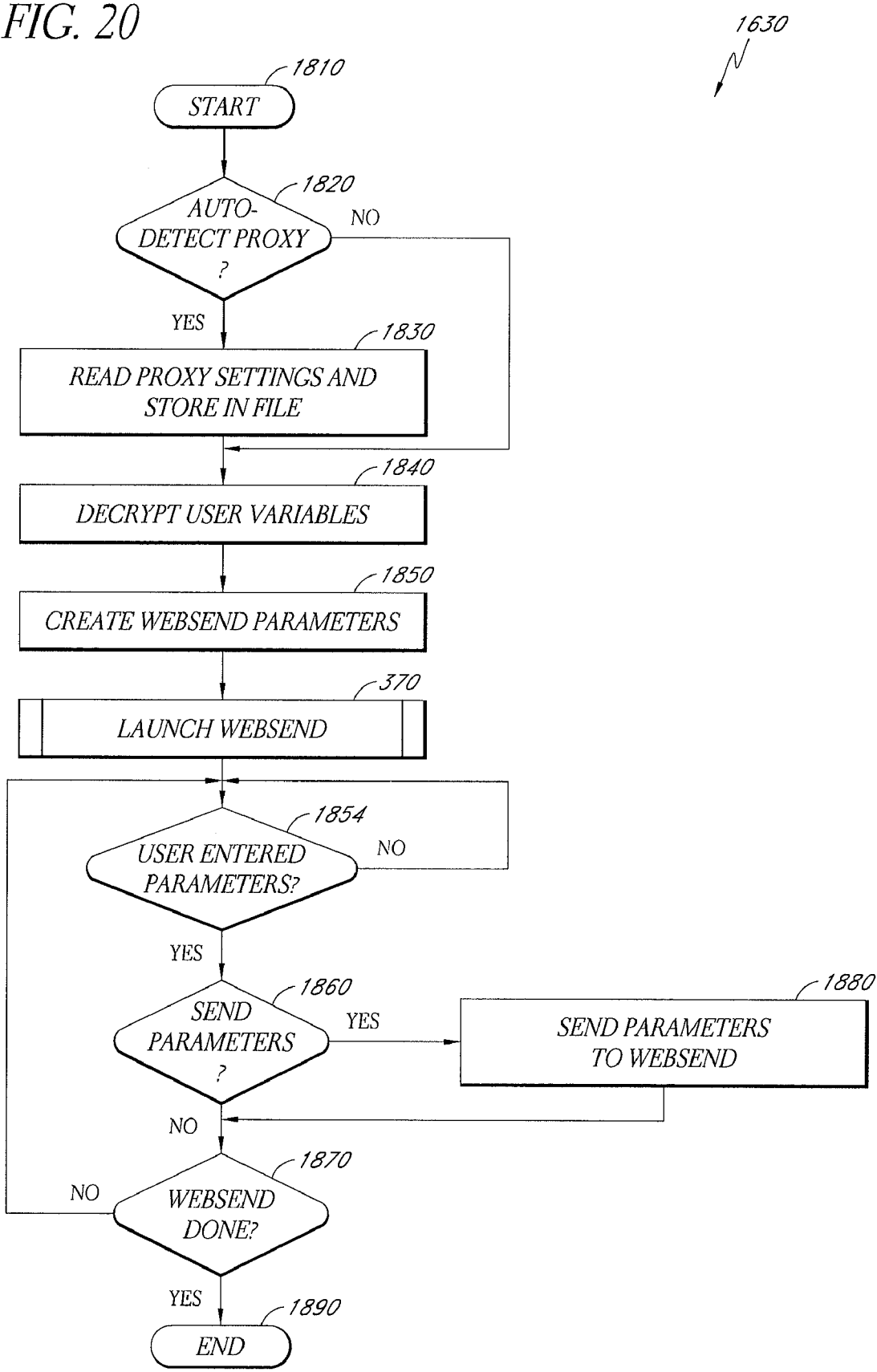
FIG. 20 is a flowchart illustrating a start communications engine processing module as invoked by the file send processing module shown in FIG. 18 and the file receive processing module shown in FIG. 19.

FIG. 20 is a flowchart illustrating a start communications engine processing module 1630 as invoked by the file send processing module 1070 shown in FIG. 18 and the file receive processing module 770 shown in FIG. 19. The start communications engine processing module 1630 in the transporter module 240 initiates the file transfer operation in the websend module 280. As described above, the websend module 280 performs the network communications with the server computer 60 of the bank website via the network 50. The start communications engine processing module 1630 begins at a start block 1810. The start communications engine processing module 1630 includes a decision block 1820 to determine whether to automatically detect the presence of a proxy server on the client network. If it is determined to automatically detect a proxy server, the start communications engine processing module 1630 continues to a block 1830 to read the proxy server settings and store the settings in a file for subsequent access by the read proxy settings block 524 in the start session processing module 450 described above with regard to FIG. 7.

After the block 1830, and if it is determined at the decision block 1820 not to automatically detect the proxy server, the start communications engine processing module 1630 decrypts the user variables at a block 1840. For security reasons, the user variables can be stored in the user settings file 260 in an encrypted format. At a block 1850, the start communications engine processing module 1630 creates the parameters to send to the websend module 280 for performing the file transfer operation. The start communications engine processing module 1630 continues to the launch websend processing module 370, the operation of which is described above with regard to FIG. 6.

At a decision block 1854, the start communications engine processing module 1630 determines whether the user entered parameters to send to the websend module 280 for use in the file transfer operation. If the user did enter websend parameters, the start communications engine processing module 1630 determines at a decision block 1860 whether to send the parameters to the websend module 280. If it is determined at the decision block 1860 to send the parameters to the websend module 280, the parameters are sent at a block 1880. After the block 1880, or if it is determined at the decision block 1860 not to send the parameters to the websend module 280, the start communications engine processing module 1630 continues to a decision block 1870 to determine whether the websend module 280 is done performing the send or receive file transfer operation. If the websend module 280 is not done, the start communications engine processing module 1630 continues back to the decision block 1854 to determine whether the user entered websend parameters. However, if the websend module 280 is done as determined at the decision block 1870, the start communications engine processing module 1630 continues to an end block 1890. The start communications engine processing module 1630 terminates at the end block 1890.

Figure 21:
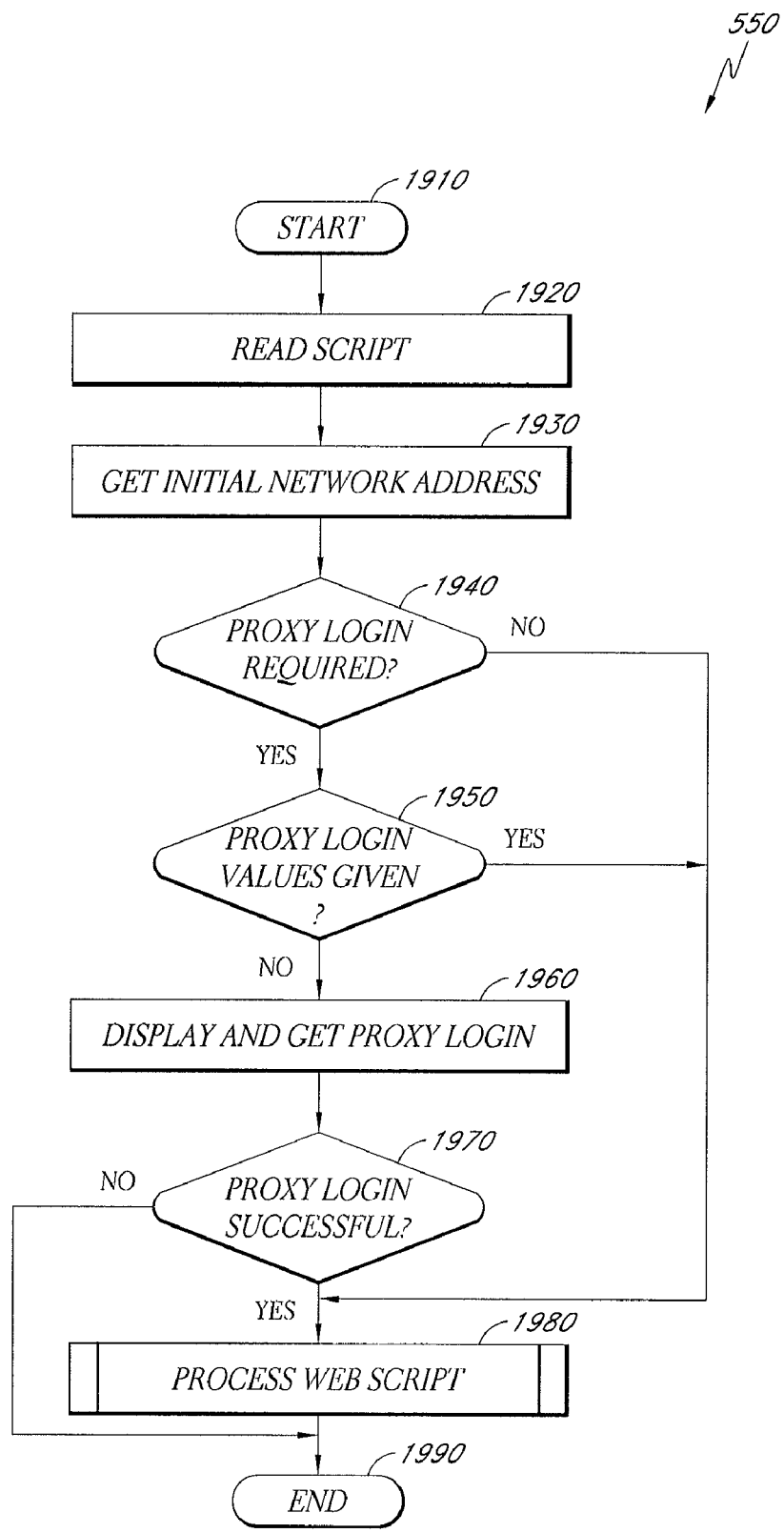
FIG. 21 is a flowchart illustrating a connect and transfer processing module as invoked by the start session processing module shown in FIG. 7.

FIG. 21 is a flowchart illustrating a connect and transfer processing module 550 as invoked by the start session processing module 450 shown in FIG. 7. The connect and transfer processing module 550 connects to one or more bank websites and prepares the websend module 280 for the transfer of files to or from the server computer 60 for the designated bank website(s). The connect and transfer processing module 550 begins at a start block 1910. The connect and transfer processing module 550 includes a block 1920 to read the script that describes how to communicate with the appropriate bank website for the file transfer. At a block 1930, the connect and transfer processing module 550 gets the initial network address to which the network messages are sent. In some embodiments, the network address is a uniform resource locator (URL), which is the way that documents, web pages, and other resources are addressed on the World Wide Web. For example, "http://www.google.com" is a URL. Alternatively, the network address can be a numeric address such as an IP (Internet Protocol) address, which can be used for website communications and file transfer protocol (FTP) communications.

At a decision block 1940, the connect and transfer processing module 550 determines whether login to a proxy server is required. If proxy login is required, the connect and transfer processing module 550 continues to a decision block 1950 to determine whether proxy login values were provided. If proxy login values were not provided, at a block 1960 proxy login information is requested on the display screen and received upon entry. The connect and transfer processing module 550 continues to a decision block 1970 to determine whether the proxy login was successful. If the proxy login was successful, the connect and transfer processing module 550 continues to a process web script module 1980. The operation of the process web script module 1980 is described below with regard to FIG. 22. If it is determined at the decision block 1940 that a proxy login is not required, or if it is determined at the decision block 1950 that proxy login values were given, the connect and transfer processing module 550 continues to the process web script module 1980. After the process web script module 1980, or if it is determined at the decision block 1970 that the proxy login was not successful, the process web script module 1980 continues to an end block 1990. The connect and transfer processing module 550 terminates at the end block 1990.

Figure 22:
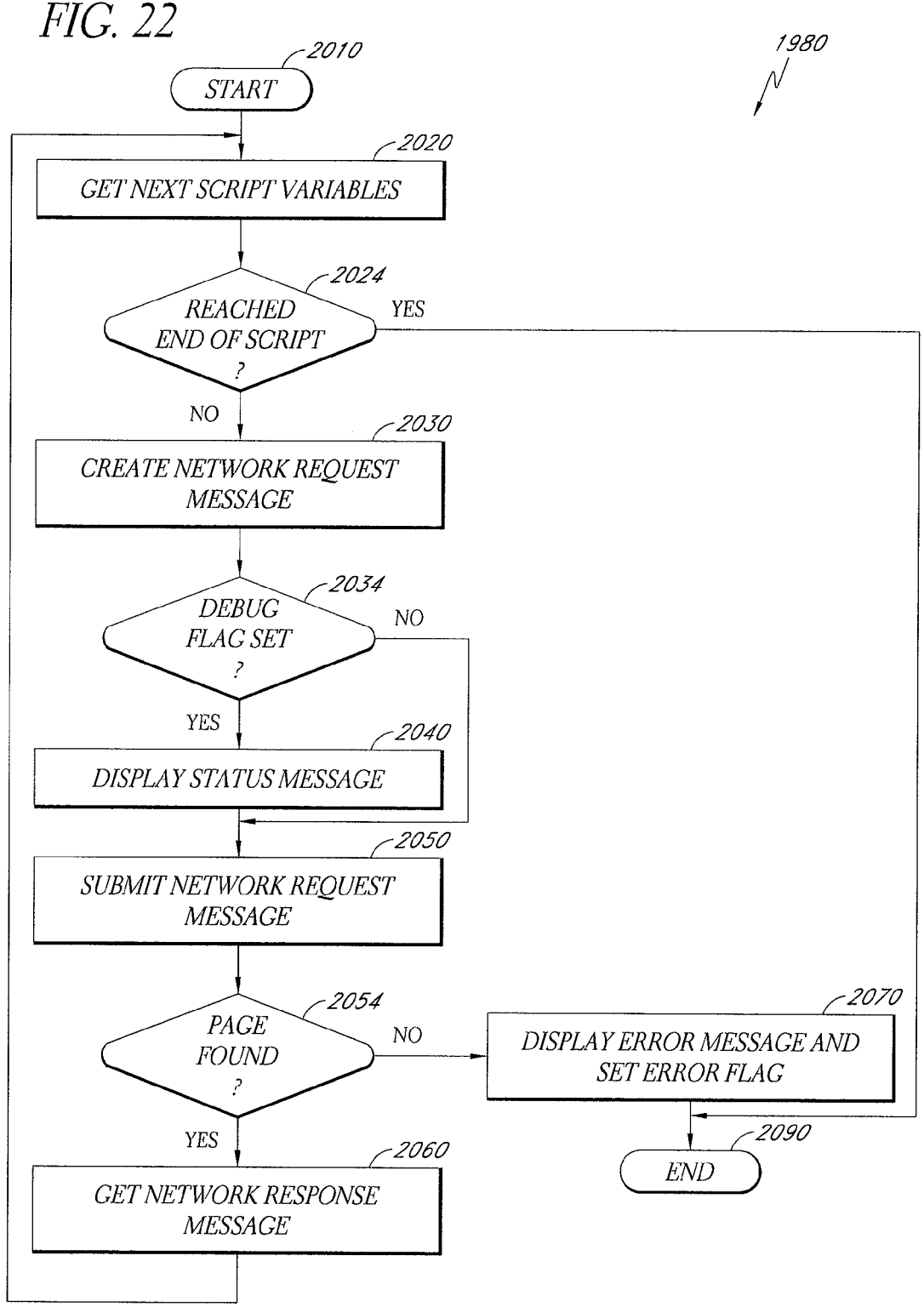
FIG. 22 is a flowchart illustrating a process web script module as invoked by the connect and transfer processing module shown in FIG. 21.

FIG. 22 is a flowchart illustrating a process web script module 1980 as invoked by the connect and transfer processing module 550 shown in FIG. 21. The process web script module 1980 of the websend module 280 communicates with the server computer 60 based on reading and processing the script files 290 that describe how to interact with the bank websites. The process web script module 1980 begins at a start block 2010. The process web script module 1980 includes a block 2020 to get the next script variables in the script file being processed. At a decision block 2024, the process web script module 1980 determines whether the end of the script file has been reached. If the end of the script file has been reached, the process web script module 1980 continues to an end block 2090. If, however, the end of the script file has not been reached at the decision block 2024, a network request message is created at a block 2030, based at least in part on the information in the script files 290.

At a decision block 2034, the process web script module 1980 determines whether the debug flag is set. If the debug flag is set, a status message is displayed at a block 2040 to provide some diagnostic or other helpful information to the user to detect and contribute to the resolution of program bugs or errors. After the block 2040, or if it is determined at the decision block 2034 that the debug flag is not set, the process web script module 1980 continues to a block 2050 to submit the network request message created in the block 2030 for transmission on the network 50. At a decision block 2054, the process web script module 1980 determines whether the web page or other destination address of the network message was found. If the web page was found, the process web script module 1980 continues to a block 2060 to get the network message that is sent in response to the network message submitted at the block 2050. After the block 2060, the process web script module 1980 continues back to the block 2020 to get the next script variables in the script file 290.

If it is instead determined at the decision block 2054 that the web page or other destination address was not found, at a block 2070 an error message is displayed and an error flag is set to indicate the page not found error condition. After the block 2070, the process web script module 1980 continues to the end block 2090. The process web script module 1980 terminates at the end block 2090.

Figure 23:
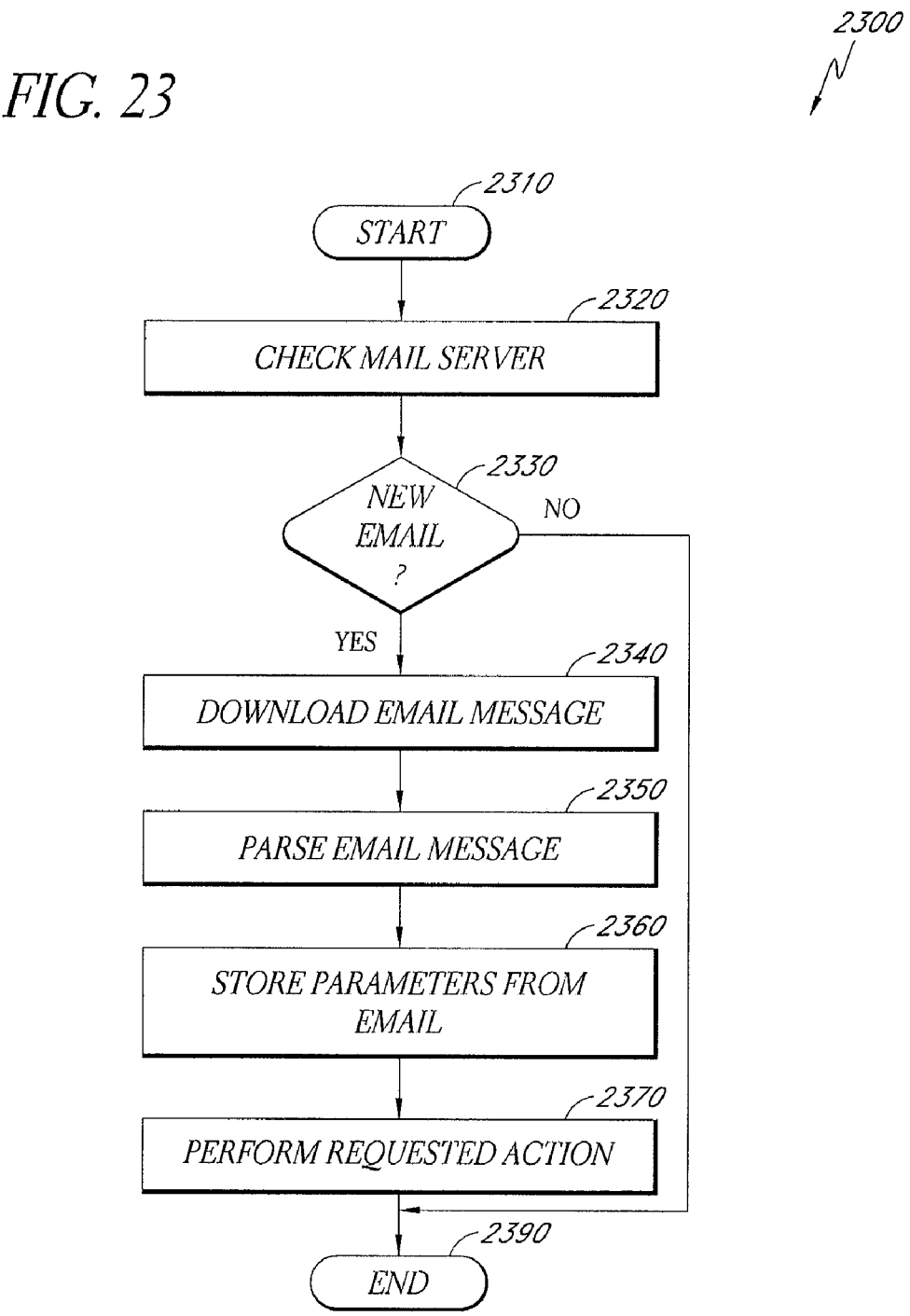
FIG. 23 is a flowchart illustrating a remote action request module.

FIG. 23 is a flowchart illustrating a remote action request module 2300. The remote action request module 2300 provides a way for the server computer 60 to request the file transfer system 200 executing on the client computer 30 to start a file upload, file download, or notification operation. Businesses, such as banks, often desire to automatically download or "push" information from the server computer 60 to the client computer 30. As the client computer 30 and the server computer 60 may not maintain a static network connection between them, the server computer 60 is not able to push the data or files to the client computer 30. Email and email attachments can be used by businesses to send data to remote computers that do not have a static network connection. However, bank data contains sensitive information that cannot be sent via email. The remote action request module 2300 enables banks to send a non-sensitive email to the file transfer system 200 on the client computer 30. Upon receipt of the email, the subject or body of the email is parsed for information instructing the file transfer system 200 of the file or data request, referred to as a remote action request.

In some embodiments, the remote action request is performed by the server computer 60 sending an email addressed to the file transfer system 200, which is assigned its own email address. One example of such an email address is remote123456@aptransporter.com. Email addresses can be maintained on a third party email server and retrieved by the file transfer system 200 using email communication protocols, for example, the POP3 protocol. The subject line or body of the email can contain encoded data fields to instruct the file transfer program of the operation to perform. The operation instructions are decoded, and the action specified by the operation is performed. If the action is a file download, once the file download is complete a notification is sent to the user of the client computer 30 with information about the download that was performed. Similarly, file uploads can be remotely requested, and upload notifications are sent.

Operation of the remote action request module 2300 is initiated at a start block 2310. At a block 2320, the remote action request module 2300 checks the mail server (not shown) for the presence of an email message addressed to the file transfer system 200 as described above. At a decision block 2330, the remote action request module 2300 determines whether a new email message is present at the mail server. If it is determined at the decision block 2330 that a new email message is present, the remote action request module 2300 continues to a block 2340 to download the email message from the mail server to the file transfer system 200. At a block 2350, the remote action request module 2300 parses the downloaded email message for information regarding an action to be performed upon receipt of the email message. For example, the information can be in the subject line of the email message, or alternatively in the body portion of the email message.

The remote action request module 2300 continues to a block 2360 to store the parameters from the email for access upon performing the requested action. At a block 2370, the remote action request module 2300 performs the requested action, such as downloading a file or data stream or uploading a file or data stream. If it is determined at the decision block 2330 that a new email message is not present at the mail server, or after the block 2370, the remote action request module 2300 continues to an end block 2390. The remote action request module 2300 terminates at the end block 2390.

In view of the above, it can be appreciated that the long standing problem in the industry of time consuming, expensive and error-prone file transfers between computers via a public network is overcome by the systems and methods described herein. For example, the file transfer system automates the transfer of files and data streams by operations such as file drag and drop, scheduled file transfers, and event-driven file transfers. The file transfer system is additionally configured to notify users of errors and the occurrence of various system operations. Still further, files and data streams can be translated automatically between various file formats without requiring any action by the users or any knowledge that file translation is required. The file transfer system can be used in the banking industry to automatically transfer positive pay files, ACH payments, EFT payments, wire transfers, EDI files, cash and account balances, and reports associated with the above information.

While the above detailed description has shown, described, and pointed out novel features of the invention as applied to various embodiments, it will be understood that various omissions, substitutions, and changes in the form and details of the device or process illustrated may be made by those of ordinary skill in the technology without departing from the spirit of the invention. This invention may be embodied in other specific forms without departing from the essential characteristics as described herein. For example, although most of the foregoing embodiments are described in the context of distributed database systems, other embodiments of the invention include many types of distributed task systems, for example, systems having disjoint, distributed processing of tasks, jobs, or operations. The embodiments described above are to be considered in all respects as illustrative only and not restrictive in any manner. The scope of the invention is indicated by the following claims rather than by the foregoing description.

What is claimed is:

1. A system for automating the transferring of files between a client computer and a server computer via a network, the system comprising:
    a plurality of profiles stored on the client computer and associated with a plurality of entities, each entity having a website for transferring files to a server computer of the entity, each profile comprising one or more variables for use in communicating with the server computer via the website;
    a plurality of scripts each associated with at least one of the plurality of entities and accessible to the client computer, each script including information indicating how to execute a file transfer with a server computer of the at least one associated entity via the website of the at least one associated entity;
    a transporter module configured to execute on the client computer and to:
        receive a file send request including information regarding a file to be sent to a server computer of a first entity of the plurality of entities via the website of the first entity, the file send request received from one of the group of processes comprising at least one of a drag and drop operation from a user, a scheduled event, an event driven file transfer, and a request from the server computer of the first entity for the client computer to send the file,
        the transporter module further configured to initiate automatically transferring the file indicated by the file send request to the server computer of the first entity and to, automatically,
        determine whether to translate the file from one file format to another file format before sending the file to the server computer of the first entity based on a variable in a profile of the first entity, and if so to translate the file, wherein the profile is selected from the plurality of profiles;
        determine whether to encrypt the file for data security before sending the file to the server computer of the first entity and if so to encrypt the file,
        access a script of the first entity to determine how to communicate with the server computer of the first entity, wherein the script is selected from the plurality of scripts, and
        communicate a file send command for sending the file from the client computer to the server computer of the first entity;
    a websend module configured to execute on the client computer and to automatically
    receive the file send command;
    read the script of the first entity; and
    send the file to the server computer of the first entity via the network according to information in the script of the first entity and one or more variables stored in the profile of the first entity; and a notification and error handling module configured to notify a user of an occurrence of a file transmission event or error.

2. The system of claim 1, further comprising a data center computer connected to the client computer via the network and configured to translate the file from a first file format to a second file format.

3. The system of claim 1, further comprising an auto-update module configured to update the script file from a remote computer system via the network.

4. The system of claim 1, further comprising a connect and transfer module configured to read login information for a proxy server from a proxy settings file and to login to the proxy server using the login information to enable the file to be sent to the server computer according to information in the script of the first entity.

5. The system of claim 1, wherein the file is encrypted so that the file is only decipherable by authorized recipients of the file.

6. The system of claim 1, wherein the event driven file transfer process is triggered by the existence of a file in a predetermined directory.

7. The system of claim 1, wherein the event driven file transfer process is triggered by the non-existence of a file in a predetermined directory.

8. The system of claim 1, wherein the server computer operates a website of a bank, and wherein account and payment information is uploaded and downloaded from the website.

9. The system of claim 8, wherein the client computer is operated by a user having at least one account with the bank.

10. The system of claim 9, wherein the file includes information selected from the group consisting of: a check written against the account, positive pay files and reports, Automated Clearing House (ACH) payments, Electronic Funds Transfer (EFT) payments, wire transfers, Electronic Data Interchange (EDI) files and reports, and cash and account balances.

11. The system of claim 1, wherein notifying the user comprises sending an email message to the user.

12. The system of claim 1, wherein the network is the Internet and the server computer is a file transfer protocol (FTP) server of a bank, and wherein account and payment information is uploaded and downloaded from the FTP server.

13. The system of claim 1, wherein the file translation is performed on the client computer or a separate computer and the file encryption is performed on the client computer or a separate computer.

14. The system of claim 1, wherein encrypting the file can be accomplished by utilizing a web session protocol which uses a secure sockets layer (SSL) protocol to encrypt data.

15. The system of claim 1, wherein one or more of the plurality of entities comprises a bank.

16. A system for automating the transferring of files between a client computer and a server computer via a network, the system comprising:
    at least one profile stored on the client computer and associated with an entity, the entity having a website for transferring files from the server computer via the network, wherein the profile comprises one or more variables for use in communicating with the server computer via the website;
    at least one script associated with the entity and accessible to the client computer, the script including information indicating how to execute a file transfer with the server computer via the website;

a websend module executing on the client computer and configured to automatically
receive a request from the server computer for receipt of a file via the website;
read the script; and
receive the file from the server computer according to information in the script and at least one variable in the profile;
a transporter module executing on the client computer and configured to automatically
receive a file receipt request including information regarding the file to be received from the server computer;
initiate transferring the file from the server computer to the client computer;
determine whether to decrypt the file, and if so to decrypt the file;
translate the file into a user predetermined format upon receipt; and
store the file at a predetermined file directory in the client computer;
an auto-update module configured to update the script from a remote computer system via the network; and
a notification and error handling module configured to notify a user of an occurrence of a file transmission event or error.

17. The system of claim 16, further comprising a data center computer connected via the network and configured to translate the received file from a first file format to a second file format.

18. The system of claim 16, wherein the request received from the server computer for receipt of the file is an email message.

19. The system of claim 16, wherein the server computer operates a bank website, and account information is available on the bank website.

20. The system of claim 19, wherein the client computer is operated by a user having an account with the bank.

21. The system of claim 20, wherein the file includes information selected from the group consisting of: a check written against the account, positive pay files and reports, Automated Clearing House (ACH) payments, Electronic Funds Transfer (EFT) payments, wire transfers, Electronic Data Interchange (EDI) files and reports, and cash and account balances.

22. The system of claim 20, wherein the file is a report generated by the server computer.

23. The system of claim 16, wherein notifying the user comprises sending an email message to the user.

24. The system of claim 16, wherein the network is the Internet.

25. The system of claim 16, wherein the file translation is performed on the client computer or a separate computer and the file decryption is performed on the client computer or a separate computer.

26. The system of claim 16, wherein the transport module is further configured to query the files available for downloading.

27. The system of claim 16, wherein the system is further configured to automate file transmission to be consistent with a schedule predetermined by the user.

28. The system of claim 16, wherein the entity comprises a bank.

29. The system of claim 16, wherein the file receipt request is received from one of the group of processes comprising at least one of a drag and drop operation from a user, selection of an icon, a scheduled event, an event driven file transfer, and a request from the server computer for the client computer to send the file.

30. A method of transferring files between a client computer and a server computer via a network, the method comprising:
receiving a file send request including information of a file to be sent to the server computer, the server computer being operated by one of a plurality of entities, each entity having a website for transferring files to a server computer of that entity, the file send request received from one of the group of processes comprising at least one of a drag and drop operation from a user, a scheduled event, an event driven file transfer, and a request from the server computer for the client computer to send the file; and automatically transferring the file indicated by the file send request to the server computer;
determining whether to translate the file from one file format to another file format before sending the file to the server computer based on a variable stored in a profile of the one entity, and if so translating the file, wherein the profile of the one entity is one of a plurality of profiles stored on the client computer comprising one or more variables for use in communicating with a server computer via a web site of the server;
determining whether to encrypt the file for data security before sending the file to the server computer and if so encrypting the file so that the file is decipherable only by authorized recipients of the file;
accessing a script associated with the one entity and including information indicating how to execute a file transfer with the server computer, the script being one of a plurality of scripts each associated with at least one of the plurality of entities;
sending the file to the server computer via the network according to information in the script and one or more variables stored in the profile;
determining whether to update the script and if so updating the script from a remote computer system via the network; and
notifying a user of an occurrence of a file transmission event or error.

31. The method of claim 30, wherein the file translation is performed on the client computer or a separate computer and the file encryption is performed on the client computer or a separate computer.

32. A program storage device for storing instructions that when executed by a processor perform the method comprising:
receiving a file send request including information of a file to be sent to a server computer, the server computer being operated by one of a plurality of entities, each entity having a website for transferring files to a server computer of that entity, the file send request received from one of the group of processes comprising at least one of a drag and drop operation from a user, a scheduled event, an event driven file transfer, and a request from the server computer for a client computer to send the file; and
automatically
transferring the file indicated by the file send request to the server computer, without human intervention,
determining whether to translate the file from one file format to another file format before sending the file to the server computer based on a variable stored in a profile of the one entity, and if so translating the file, wherein the profile of the one entity is one of a plurality of profiles stored on the client computer comprising one or more variables for use in communicating with a server computer via a website of the server;

encrypting the file so that the file is decipherable only by authorized recipients of the file;

accessing a script associated with the one entity and including information indicating how to execute a file transfer with the server computer, the script being one of a plurality of scripts each associated with at least one of the plurality of entities;

sending the encrypted file to the server computer via a network according to information in the script and one or more variables stored in the profile;

updating the script from a remote computer system via the network; and notifying a user of an occurrence of a file transmission event or error.

* * * * *

UNITED STATES PATENT AND TRADEMARK OFFICE
CERTIFICATE OF CORRECTION

| | | |
|---|---|---|
| PATENT NO. | : 7,565,414 B1 | Page 1 of 1 |
| APPLICATION NO. | : 10/987052 | |
| DATED | : July 21, 2009 | |
| INVENTOR(S) | : Richard I. Love | |

It is certified that error appears in the above-identified patent and that said Letters Patent is hereby corrected as shown below:

On the title page, below "Filed: Nov. 12, 2004" (item 22), insert --Related U.S. Application Data (63) Continuation of application No. 10/819,450, filed on Apr. 7, 2004, now abandoned. (60) Provisional application No. 60/460,593, filed on Apr. 7, 2003.--.

At column 1, line 7, after "This application", insert --is a continuation of U.S. Patent Application No. 10/819,450, filed Apr. 7, 2004, now abandoned, which--.

Signed and Sealed this

Second Day of March, 2010

David J. Kappos
*Director of the United States Patent and Trademark Office*